United States Patent
Hamada

(10) Patent No.: US 9,904,677 B2
(45) Date of Patent: Feb. 27, 2018

(54) DATA PROCESSING DEVICE FOR CONTEXTUAL ANALYSIS AND METHOD FOR CONSTRUCTING SCRIPT MODEL

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Shinichiro Hamada, Kanagawa (JP)

(73) Assignees: KABUSHIKI KAISHA TOSHIBA, Tokyo (JP); TOSHIBA SOLUTIONS CORPORATION, Kanagawa (JP)

( * ) Notice: Subject to any disclaimer, the term of this patent is extended or adjusted under 35 U.S.C. 154(b) by 124 days.

(21) Appl. No.: 14/837,197

(22) Filed: Aug. 27, 2015

(65) Prior Publication Data
US 2016/0012040 A1    Jan. 14, 2016

Related U.S. Application Data

(63) Continuation of application No. PCT/JP2013/055477, filed on Feb. 28, 2013.

(51) Int. Cl.
*G06F 17/27* (2006.01)
*G06F 17/28* (2006.01)
*G06K 9/00* (2006.01)

(52) U.S. Cl.
CPC ............. *G06F 17/28* (2013.01); *G06F 17/27* (2013.01); *G06F 17/2785* (2013.01); *G06K 9/00469* (2013.01)

(58) Field of Classification Search
CPC .................................................. G06F 17/2785
See application file for complete search history.

(56) References Cited

U.S. PATENT DOCUMENTS 6,925,432 B2 *  8/2005  Lee ................... G06F 17/30707
                                                  704/5
8,856,642 B1 * 10/2014  Riediger ................. G06F 17/00
                                                  704/4
(Continued)

FOREIGN PATENT DOCUMENTS

CN     101872341    10/2010
CN     101968785     2/2011
(Continued)

OTHER PUBLICATIONS

Xia, Rui, Chengqing Zong, and Shoushan Li. "Ensemble of feature sets and classification algorithms for sentiment classification." Information Sciences 181.6 (2011): 1138-1152.*

(Continued)

*Primary Examiner* — Jialong He
(74) *Attorney, Agent, or Firm* — Amin, Turocy & Watson LLP

(57) ABSTRACT

According to an embodiment, a data processing device includes an extractor, a generator, and a constructor. The extractor is configured to extract, from a document having been subjected to predicate argument structure analysis and anaphora resolution, an element sequence including elements each being a combination of predicate having a shared argument and case type information of the shared argument, together with the shared argument. The generator is configured to produce case example data expressed by a feature vector for each attention element which is one of the elements. The feature vector includes feature value(s) about a sub-sequence having the attention element and feature value(s) about a sequence of the shared argument corresponding to the sub-sequence. The constructor is configured to construct a script model for estimating the elements each following antecedent context by performing machine learn- (Continued)

ing based on a discriminative model using the case example data.

6 Claims, 16 Drawing Sheets

(56) References Cited

U.S. PATENT DOCUMENTS

| | | | |
|---|---|---|---|
| 2002/0022956 A1* | 2/2002 | Ukrainczyk | G06F 17/218 704/9 |
| 2002/0040435 A1* | 4/2002 | Hamada | G06Q 30/06 713/189 |
| 2004/0024585 A1* | 2/2004 | Srivastava | G10L 25/78 704/10 |
| 2007/0282596 A1* | 12/2007 | Suzuki | G06F 17/2775 704/9 |
| 2008/0162117 A1* | 7/2008 | Bangalore | G06F 17/2818 704/10 |
| 2008/0201130 A1* | 8/2008 | Peters | G06F 17/27 704/9 |
| 2009/0171662 A1* | 7/2009 | Huang | G10L 15/1822 704/251 |
| 2010/0094829 A1 | 4/2010 | Castellanos et al. | |
| 2010/0275179 A1 | 10/2010 | Mengusoglu et al. | |
| 2011/0246461 A1 | 10/2011 | Jung et al. | |
| 2012/0179453 A1* | 7/2012 | Ghani | G06F 17/27 704/9 |
| 2012/0183935 A1* | 7/2012 | Hamada | G06F 17/2755 434/167 |
| 2013/0110497 A1* | 5/2013 | Medero | G06F 17/27 704/9 |
| 2013/0346066 A1* | 12/2013 | Deoras | G06F 17/27 704/9 |
| 2015/0032444 A1* | 1/2015 | Hamada | G06F 17/2715 704/9 |

FOREIGN PATENT DOCUMENTS

| | | |
|---|---|---|
| CN | 102110304 | 6/2011 |
| JP | 11-250085 | 9/1999 |
| WO | 2011/122730 A1 | 10/2011 |

OTHER PUBLICATIONS

Yao, Limin, David Mimno, and Andrew McCallum. "Efficient methods for topic model inference on streaming document collections." Proceedings of the 15th ACM SIGKDD international conference on Knowledge discovery and data mining. ACM, 2009.*

Chambers et al. "Unsupervised Learning of Narrative Schemas and their Participants", Proceedings of the 47th Annual Meeting of the ACL and the 4th IJCNLP of the AFNLP, pp. 602-610, Suntec, Singapore, Aug. 2-7, 2009.*

Japanese Office Action for Japanese Patent Application No. 2015-502663 dated Jan. 5, 2016.

Written Opinion for International Patent Application No. PCT/JP2013/055477 dated Apr. 2, 2013, 4 pages.

International Search Report for International Patent Application No. PCT/JP2013/055477 dated Apr. 2, 2013, 3 pages.

V. Pekar. "Acquisition of verb entailment from text", in "Proceedings of the Main Conference on Human Language Technology Conference of the North American Chapter of the Association of Computational Linguistics", pp. 49-56. Association for Computational Linguistics, 2006.

I. Szpektor, et al. "Learning Entailment Rules for Unary Templates", in "Proceedings of the 22nd International Conference on Computational Linguistics—vol. 1", pp. 849-856. Association for Computational Linguistics, 2008.

N. Chambers, et al. "Unsupervised Learning of Narrative Schemas and their Participants", in "Proceedings of the Joint Conference of the 47th Annual Meeting of the ACL and the 4th International Joint Conference on Natural Language Processing of the AFNLP—vol. 2", pp. 602-610. Association for Computational Linguistics, 2009.

R. Kneser, et al. "Improved Backing-Off for M-Gram Language Modeling", in "Proceedings of ICASSP", vol. 1, pp. 181-184, 1995.

R. Rosenfeld. "Adaptive Statistical Language Modeling: A Maximum Entropy Approach", PhD Thesis, Technical Report CMU-CS-94-138, School of Computer Science, Carnegie Mellon University, Pittsburgh, PA, 114 pages, 1994.

J. Goodman. "A Bit of Progress in Language Modeling", in Computer Speech and Language, vol. 15, No. 4, pp. 403-434, 2001, Elsevier.

S. Martin, et al. "Assessment of Smoothing Methods and Complex Stochastic Language Modeling", in 6th European Conference on Speech Communication and Technology, vol. 5, pp. 1939-1942, Budapest, Hungary, Sep. 1999.

International Search Report for International Application No. PCT/JP2013/055477 dated Apr. 2, 2013, 5 pages.

* cited by examiner

```
================================================================
text and word-segmentation info Yamada committed homicide .
01-------- 02---------- 03---------- 04

Then the criminal was caught by the police and thrown into prison .
05---- 06- 07-------- 08-- 09------ 10 11- 12----- 13-- 14------ 15-- 16----- 17

================================================================
anaphora-resolved predicate-argument-structure info

[P01e] pred:02 mean:v2 agent:01 object:03
[P02e] pred:09 mean:v1 agent:12 object:07
[P03e] pred:14 mean:v4 agent:12 object:07

================================================================
coreference info

[C01e] 01(02:agent),07(09:object),07(14:object)
[C02e] 12(09:agent),12(14:agent)
```

FIG.7

```
y:
投獄する(動4).ヲ格 x:
[EventSlot]投獄する(動4).ヲ格:1, [EventSlot]捕まえる(動1).ヲ格_投獄する(動4).ヲ格:1,
[ShareArg]山田:1, [ShareArg]山田_山田:1,
[ShareArg]犯罪者:1, [ShareArg]犯罪者_犯罪者:1,
[ShareArg]<PERSON>:1, [ShareArg]<PERSON>_<PERSON>:1,
[ShareArg]<Thing>:1, [ShareArg]<Thing>_<Thing>:1,
[ShareArg]<Thing/Agent>:1, [ShareArg]<Thing/Agent>_<Thing/Agent>:1,
[ShareArg]<Thing/Agent/Person>:1, [ShareArg]<Thing/Agent/Person>_<Thing/Agent/Person>:1
```

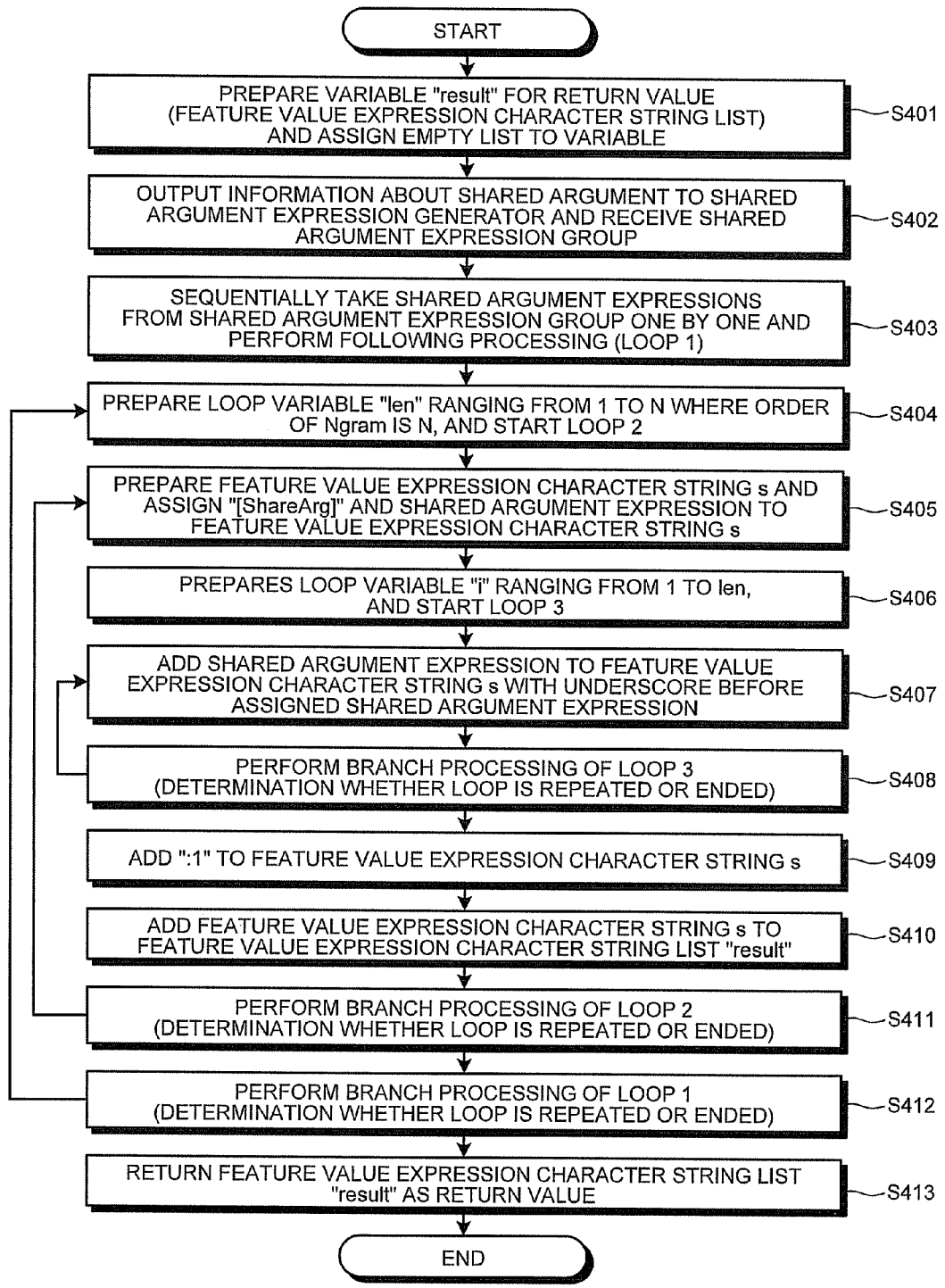

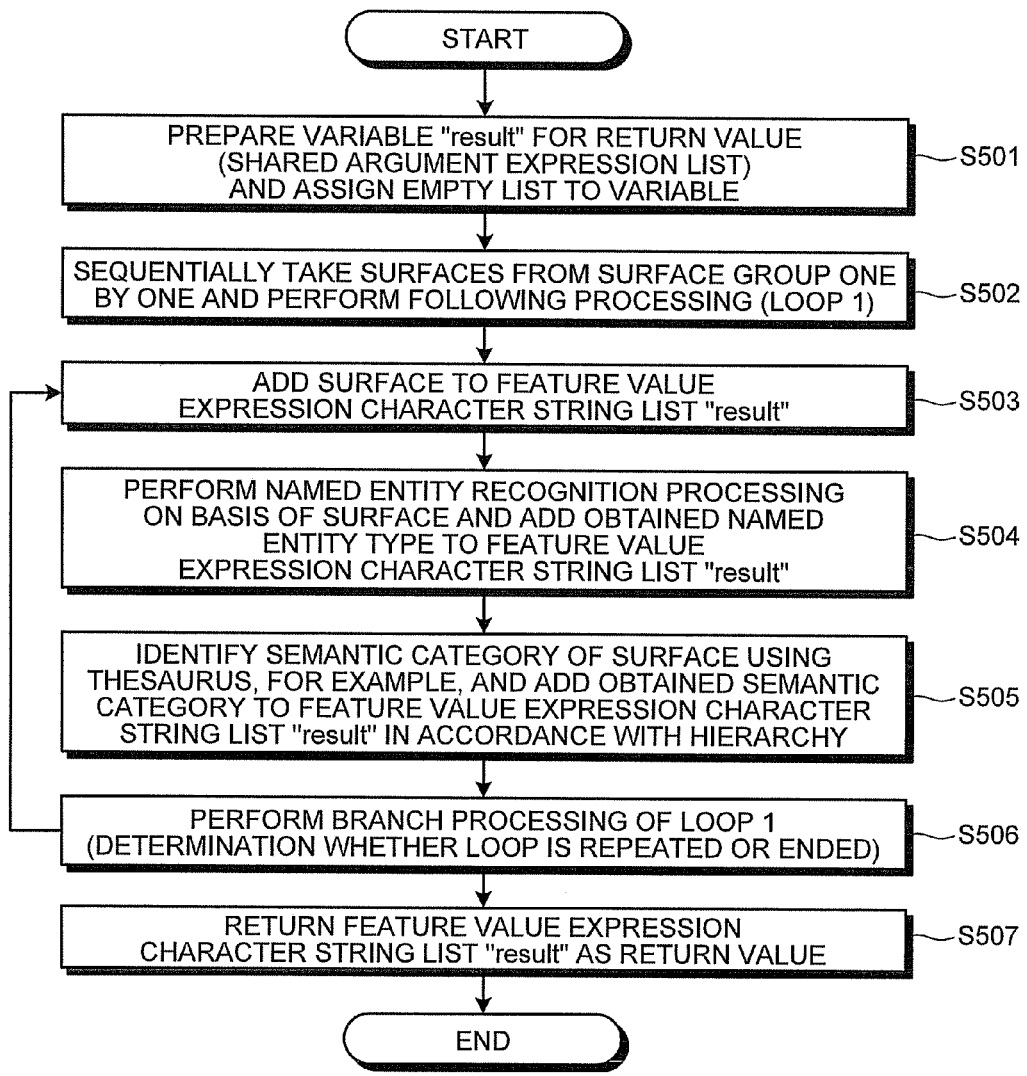

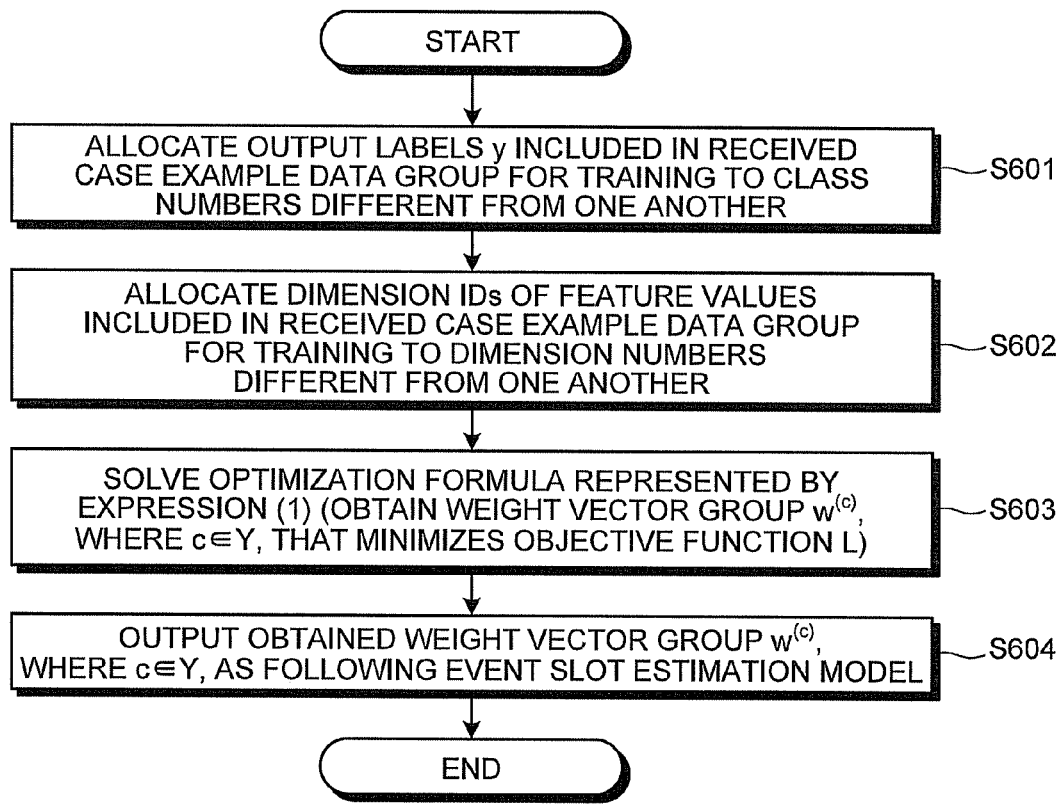

START

S601 — ALLOCATE OUTPUT LABELS y INCLUDED IN RECEIVED CASE EXAMPLE DATA GROUP FOR TRAINING TO CLASS NUMBERS DIFFERENT FROM ONE ANOTHER

S602 — ALLOCATE DIMENSION IDs OF FEATURE VALUES INCLUDED IN RECEIVED CASE EXAMPLE DATA GROUP FOR TRAINING TO DIMENSION NUMBERS DIFFERENT FROM ONE ANOTHER

S603 — SOLVE OPTIMIZATION FORMULA REPRESENTED BY EXPRESSION (1) (OBTAIN WEIGHT VECTOR GROUP $w^{(c)}$, WHERE $c \in Y$, THAT MINIMIZES OBJECTIVE FUNCTION L)

S604 — OUTPUT OBTAINED WEIGHT VECTOR GROUP $w^{(c)}$, WHERE $c \in Y$, AS FOLLOWING EVENT SLOT ESTIMATION MODEL

END

FIG.15

```
           START
             ↓
┌─────────────────────────────────────┐
│ REMOVE LAST ELEMENT OF "</s>" FROM  │
│ EVENT SLOT SEQUENCE OF EVENT SLOT   │──S701
│      SEQUENCE DATA FOR PREDICTION    │
└─────────────────────────────────────┘
             ↓
┌─────────────────────────────────────────┐
│ REGARD REMAINING EVENT SLOT SEQUENCE    │
│ AS HISTORY, PERFORM PROCESSING IN SAME  │
│ MANNER AS STEP S202, STEP S203 AND FROM │──S702
│ STEP S205 TO STEP S208 (BECAUSE LABEL y │
│ IS UNNECESSARY, CORRESPONDING SECTION   │
│ REMAINS EMPTY OR IS FILLED WITH DUMMY   │
│ VALUE)                                  │
└─────────────────────────────────────────┘
             ↓
            END
```

```
y:
 投獄する(動4).ヲ格 x:
[EventSlot]投獄する(動4).ヲ格:1, [EventSlot]捕まえる(動1).ヲ格_投獄する(動4).ヲ格:1,
[Wild&Arg]捕まえる(動1).ヲ格_投獄する(動4).ヲ格&山田:1,
[Wild&Arg]捕まえる(動1).ヲ格_投獄する(動4).ヲ格&犯罪者:1,
[Wild&Arg]捕まえる(動1).ヲ格_投獄する(動4).ヲ格&<PERSON>:1,
[Wild&Arg]捕まえる(動1).ヲ格_投獄する(動4).ヲ格&<Thing>:1,
[Wild&Arg]捕まえる(動1).ヲ格_投獄する(動4).ヲ格&<Thing/Agent>:1,
[Wild&Arg]捕まえる(動1).ヲ格_投獄する(動4).ヲ格&<Thing/Agent/Person>:1,
[Wild&Arg]*_投獄する(動4).ヲ格&山田:1,
[Wild&Arg]*_投獄する(動4).ヲ格&犯罪者:1,
[Wild&Arg]*_投獄する(動4).ヲ格&<PERSON>:1,
[Wild&Arg]*_投獄する(動4).ヲ格&<Thing>:1,
[Wild&Arg]*_投獄する(動4).ヲ格&<Thing/Agent>:1,
[Wild&Arg]*_投獄する(動4).ヲ格&<Thing/Agent/Person>:1,
[Wild&Arg]捕まえる(動1).ヲ格_*&山田:1,
[Wild&Arg]捕まえる(動1).ヲ格_*&犯罪者:1,
[Wild&Arg]捕まえる(動1).ヲ格_*&<PERSON>:1,
[Wild&Arg]捕まえる(動1).ヲ格_*&<Thing>:1,
[Wild&Arg]捕まえる(動1).ヲ格_*&<Thing/Agent>:1,
[Wild&Arg]捕まえる(動1).ヲ格_*&<Thing/Agent/Person>:1,
[Wild&Arg]*_*&山田:1,
[Wild&Arg]*_*&犯罪者:1,
[Wild&Arg]*_*&<PERSON>:1,
[Wild&Arg]*_*&<Thing>:1,
[Wild&Arg]*_*&<Thing/Agent>:1,
[Wild&Arg]*_*&<Thing/Agent/Person>:1
```

DATA PROCESSING DEVICE FOR CONTEXTUAL ANALYSIS AND METHOD FOR CONSTRUCTING SCRIPT MODEL

CROSS-REFERENCE TO RELATED APPLICATION

This application is a continuation of International Application No. PCT/JP2013/055477, filed on Feb. 28, 2013, the entire contents of which are incorporated herein by reference.

FIELD

Embodiments described herein relate generally to a data processing device and a script model construction method.

BACKGROUND

In natural language processing, performing contextual analysis such as anaphora resolution, coreference resolution, and dialog processing is an important task for the purpose of correctly understanding a document. It is a known fact that the use of procedural knowledge such as the notation of script by Schank and the notation of frame by Fillmore in contextual analysis proves effective. The procedural knowledge relates to what is the procedure following a certain series of procedures. A model that reproduces the procedural knowledge by a computer is a script model.

Conventionally, it has been developed that a sequence of pairs of a predicate and a case associating with each other (hereinafter the pair is called an "event slot") is acquired from an arbitrary group of documents, case example data is produced from the event slot sequence, and a script model is constructed by performing machine learning using the case example data as training data.

The event slot sequence is composed of the event slots. The event slot is a combination of a predicate having a shared argument and a type of case of the shared argument. In the event slot sequence, the event slots are arranged in order of appearances of the predicates. The event slot, which is the element of the event slot sequence, varies in many types. In order to construct a script model with high accuracy by performing adequate learning, a huge amount of learning data equivalent to that model is required. The acquisition of a large amount of highly reliable learning data requires huge costs. There is concern that insufficient collection of learning data causes a lack of learning data and thus the constructed script model has low accuracy.

BRIEF DESCRIPTION OF THE DRAWINGS

FIG. 4 illustrates a specific example of a tagged document for training;

FIG. 7 is a schematic diagram illustrating a specific example of case example data for training;

FIG. 10 is a flowchart explaining processing performed by a shared argument history feature generator;

FIG. 11 is a schematic diagram illustrating an example of a shared argument expression group produced by a shared argument expression generator;

FIG. 12 is a flowchart explaining processing performed by the shared argument expression generator;

FIG. 13 is a schematic diagram illustrating an example of a following event slot estimation model;

FIG. 14 is a flowchart explaining processing performed by a following event slot estimation trainer;

FIG. 15 is a flowchart explaining processing performed by the case example generator in prediction processing;

FIG. 16 is a schematic diagram illustrating an example of a following event slot estimation result;

FIG. 19 is a schematic diagram illustrating a specific example of case example data for training;

DETAILED DESCRIPTION

Figure 1:
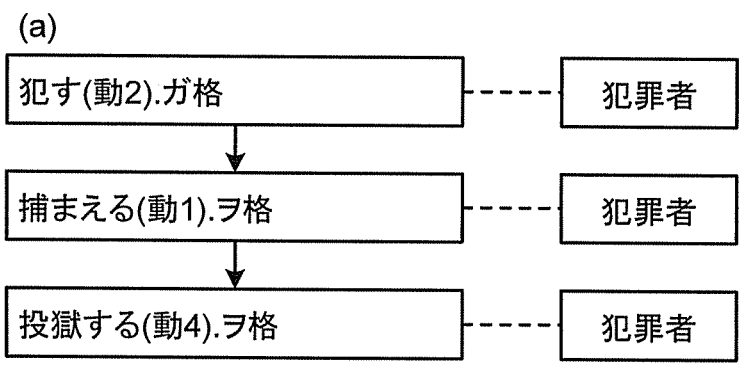
FIG. 1 illustrates a probabilistic model using an event slot sequence in which predicates have a shared argument of "criminal"

According to an embodiment, a data processing device includes an extractor, a case example generator, and a model constructor. The extractor is configured to extract, from a document having been subjected to predicate argument structure analysis and anaphora resolution, an element sequence in which a plurality of elements are arranged in order of appearances of predicates in the document. The elements each are a combination of the predicate having a shared argument and case type information indicating a type of a case of the shared argument, together with the shared argument. The case example generator is configured to produce case example data expressed by a feature vector for each attention element. The attention element is one of the elements included in the element sequence. The feature vector includes at least one of one or more feature values about a sub-sequence having the attention element as a last element of the sub-sequence in the element sequence and one or more feature values about a sequence of the shared argument corresponding to the sub-sequence. The model constructor is configured to construct a script model for estimating the elements each following antecedent context by performing machine learning based on a discriminative model using the case example data.

The following describes embodiments of a data processing device and a script model construction method with reference to the accompanying drawings.

The use of a script model constructed by machine learning is very effective as a technique to correctly understand context in contextual analysis. Particularly, in recent years, cloud smart communication over the Internet has been widely used. Analysis is performed that picks up reputations and opinions on the Internet from consumer generated media (CGM) such as message boards, blogs, Twitter (registered trademark), and social networking services (SNSs). In such analysis, it is expected that the use of the script model facilitates the correct understanding of context.

In the script model construction method according to the embodiment, an event slot sequence group is extracted from a document group having been subjected to predicate argument structure analysis and coreference resolution, a case example data group for machine learning is produced using the extracted event slot sequence group, and a script model is constructed by machine learning using the case example data group.

The event slot sequence is a sequence of pairs of a predicate having a shared argument and a type of case of the shared argument. Conventionally, attempts have been made to perform contextual analysis using a probabilistic model of the event slot sequence as the procedural knowledge. This is based on the hypothesis that predicates having a shared argument are in some kind of relation to each other. In the conventional techniques, the shared argument is used for finding out the event slot and counting of frequencies of appearances is performed only on the event slot sequence from which the shared argument is excluded.

FIG. 1 illustrates a probabilistic model using the event slot sequence in which the predicates have a shared argument of "criminal". In FIG. 1, (a) illustrates an example in Japanese while (b) illustrates an example in English. Each arrow in FIG. 1 indicates the presence of the probabilistic model. The arrow bottom indicates a variable serving as the condition in a conditional probability while the arrow head indicates a variable to be evaluated. Each broken line indicates absence of the probabilistic model. In the conventional techniques, for the example illustrated in (b) in FIG. 1, the counting of frequencies (probability calculation based on the counting) is performed on only the event slot sequence of commit(v2).Agent, arrest(v1).Object, and imprison(v2).Object, from which "Criminal" serving as the shared argument is excluded. In the example illustrated in (b) in FIG. 1, word sense identification information that identifies the word sense of the predicate (e.g., v2, v1, and v2) is added to the predicate of each event slot constituting the event slot sequence by performing word sense disambiguation processing on the predicate. The addition of the word sense identification information is not mandatory.

The event slot, which is the element of the event slot sequence, is the combination of the predicate and the type of case of the shared argument. The number of event slots is the product of the number of predicates and the number of types of cases of the shared argument, and thus is very huge. As a result, for performing adequate learning, a huge amount of learning data is required. The acquisition of massive high reliability learning data requires huge costs. Thus, a problem arises in that insufficient collection of learning data causes a lack of learning data and thus the constructed model has low accuracy.

In the lack of learning data, it is particularly fatal that no clue about coherence is obtained. In the example illustrated in (b) in FIG. 1, when learning the coherence of "arrest(v1).Object" and "imprison(v2).Object", the conventional techniques need to count the frequencies of successive appearances of the event slots. In learning data, a case can often occur where the successive appearance of the two event slots never happens. This case makes it impossible to make predictions taking the coherence into consideration, thereby resulting in marked deterioration of accuracy.

As for a technique to solve the problem of zero probability (no appearance), various smoothing techniques have been proposed (e.g., refer to R. Kenser and H. Ney, "Improved backing-off for m-gram language modeling", *Proceedings of ICASSP*, Vol. 1, pp, 181-184, 1995). Those smoothing techniques allocate a certain low probability to an unknown sequence. The soothing techniques, which eliminate statistical unevenness, can avoid zero probability but may not guarantee to always allocate an appropriate probability.

The essential problem is a lack of clues for solving the problem of what is the event slot following a certain event slot. The embodiment proposes a method for constructing a script model with high accuracy by extracting further clues for predicting the following event slot than those in the conventional techniques from a certain amount of analyzed text for learning (documents having been subjected to the predicate argument structure analysis and the coreference resolution).

A tree structure composed of three types of nodes of a predicate, a plurality of cases subordinated to the predicate, and arguments having the respective cases is called a predicate argument structure. The predicate argument structure is applicable for all languages such as Japanese and English. In Japanese, the types of cases are represented by particles such as "ga", "wo", and "ni". In English, the types of cases are represented by the locations in a sentence (subjective case and objective case) or determined on the basis of the meaning of the sentence. In this way, expressions of the cases differ from language to language.

The predicate argument structure of a sentence can be analyzed by a predicate argument structure analyzer. The predicate argument structure analyzer is prepared for each language and processes expression ways of the cases unique to the language to output the predicate argument structure. The output predicate argument structure is the same as each language whereas the types of cases differ from language to language. The embodiment uses the existing predicate argument structure analyzer. It is thus unnecessary to pay attention to the difference in expression ways of cases. In other words, the embodiment is not specialized in Japanese but applicable to all languages.

The system of the case grammar includes a surface case system and a deep case system. The surface case system is mainly used for Japanese. The surface case system is the classifying method of cases in which the surface phenomena such as "ga", "wo", and "ni" are dealt with the types of cases without any change. The deep case system is the method for classifying cases from semantic point of view. The difference between the surface case and the deep case systems are also absorbed by the predicate argument structure analyzer. The following description is made using only examples in Japanese. The embodiment is, however, applicable to all languages as described above.

Overview of Embodiment

The following describes the overview of the script model construction method in the embodiment. Basically, the script model construction method in the embodiment uses the frequency of a sequence of the shared argument in addition to the frequency of the event slot sequence used by the conventional techniques as information about the coherence of the event slot serving as a clue for predicting the following event slot. In the embodiment, two types of statistics, which are the frequency of the event slot sequence and the frequency of the shared argument sequence, are used as evaluation values, and the probability of the following event slot is obtained using calculation processing including the addition of the two types of statistics. The addition has an effect of taking a logical add of the clues. This makes it possible to predict the coherence of the event slot when at least one of the clues is effective.

The functions to be achieved in the embodiment are as follows.

Function A: calculation of the frequency (statistic equivalent to the frequency) of the event slot sequence.

Function B: calculation of the frequency (statistic equivalent to the frequency) of the shared argument sequence.

Function C: calculation of a probability by integrating the statistic obtained by Function A and the statistic obtained by Function B including processing to take the logical add of the two statistics.

In general, the machine learning technique based on a discriminative model can derive a conditional probability distribution for predicting an event from a plurality of different events by single optimization processing. Paying attention to this point, the embodiment proposes a technique that solves the processing to calculate the statistic of Function A and statistic of Function B, which differ from each other, and the processing to integrate multiple statistics by the function C by single optimization processing using a machine learning technique based on the discriminative model.

Specifically, the script model construction method in the embodiment includes the following procedures.

Procedure 1: extraction of the event slot sequence group having shared arguments from a document group having been subjected to the predicate argument structure analysis and the coreference resolution.

Procedure 2: Production of case example data (x,y) of a feature vector x and a label y for each event slot (an attention element) in the event slot sequence of the event slot sequence group extracted by Procedure 1 to obtain a case example data group. The feature vector x includes at least one of one or more feature values about a history of the event slot (the attention element) and one or more feature values about a history of the shared argument. The label y identifies the event slot (attention element).

Procedure 3: Construction of a script model by resolving (performing machine learning) a multi-class problem, with the case example data group acquired by Procedure 2 as learning data, using a discriminative model technique such as logistic regression that can calculate a probability.

In the embodiment, the history of the event slot is a sub-sequence (Ngram sequence) having the event slot as the last element in the event slot sequence. For example, when the order of Ngram order is two (bigram), in the example illustrated in (a) in FIG. 1, the history of 投獄する(動4). ヲ格 (corresponding to imprison(v2).Object in (b) in FIG. 1) is 捕まえる(動1). ヲ格 (corresponding to arrest(v1).Object in (b) in FIG. 1) and 投獄する(動4). ヲ格 (corresponding to imprison(v2).Object) while the history of 捕まえる(動1). ヲ格 (corresponding to arrest(v1).Object) is 犯す(動2). ガ格 (corresponding to commit(v2).Agent in (b) in FIG. 1) and 捕まえる(動1). ヲ格 (corresponding to arrest(v1).Object). The feature value about the history of the event slot includes not only the feature value of the Ngram sequence but also the feature values of all of the sub-sequences having an order equal to or smaller than n. For example, when the order of Ngram is two, the feature value about the history of the event slot includes not only the feature value of sub-sequence having the event slot and the event slot before the event slot as elements but also the feature value of the sub-sequence (unigram sequence, in the embodiment, unigram sequence is also regarded as the sequence) having only the event slot as the element. As a result, a smoothing effect is obtained by using the unigram for complement when the frequency of the bigram is zero.

In the embodiment, the history of the shared argument is the shared argument sequence corresponding to the sub-sequence of the event slot. For example, in the example illustrated in (a) in FIG. 1 in the bigram sequence, both of the history of the shared argument of 投獄する(動4). ヲ格 (corresponding to imprison(v2).Object) and the history of 投獄する(動1). ヲ格 (corresponding to arrest(v1).Object) are 犯罪者 (corresponding to Criminal) and 犯罪者 (corresponding to Criminal). The history of the shared argument represents the number of shared arguments (the number of serial shared arguments) corresponding to the number of elements included in the sub-sequence. The feature value about the history of the shared argument includes not only the feature value of the surface sequence such as "Criminal" but also the feature value of the another expression sequence that expresses a semantic category or a named entity type of the shared argument, for example. As a result, the frequency of the shared argument sequence can be obtained with an appropriate granularity.

The use of the discriminative model for constructing a language model is described in R. Rosenfeld, "Adaptive Statistical Language Modeling: A maximum Entropy Approach", Ph. D. Thesis, *Technical Report CMW-CS-94-138*, School of Computer Science, Carnegie Mellon University, Pittsburgh, Pa., 114 pages, 1994. This document introduces integration examples of various statistics using a discriminative model. In section 5.3, a construction of a language model is described as an example by combining Ngrams and Triggers serving as two clues. The embodiment can construct a script model by applying the technique described in this document and using the machine learning technique based on the discriminative model, for example.

As described above, the case example data represented by the case example vector including the feature values about the history of the event slot and the feature values about the history of the shared argument is produced from the event slot sequence, and a script model is constructed by performing machine learning based on the discriminative model using the case example data, in the embodiment. As a result, a script model having high accuracy can be constructed.

Figure 2:
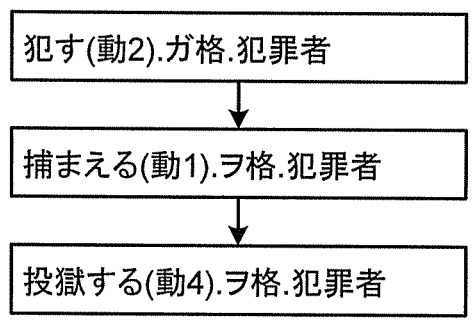
FIG. 2 is a schematic diagram explaining the technique described in N. Chambers and D. Jurafsky, "Unsupervised learning of narrative schemas and their participants", *Proceedings of the Joint Conference of the 47th Annual Meeting of the Association for Computational Linguistics and the 4th International Joint Conference on Natural Language Proceeding of the AFNLP*, Volume 2-Volume 2, pages 602-610, 2009.

As for the construction of a probabilistic model using the event slot sequence, the use of information about the shared argument together with the information about the event slot sequence is described in N. Chambers and D. Jurafsky, "Unsupervised learning of narrative schemas and their participants", *Proceedings of the Joint Conference of the 47th Annual Meeting of the Association for Computational Linguistics and the 4th International Joint Conference on Natural Language Proceeding of the AFNLP*, Volume 2-Volume 2, pages 602-610, 2009. The technique described in this document does not use information about the history of the shared argument but uses the information about the shared argument for more strictly discriminating the event slot sequences from one another. The technique described in the document constructs a probabilistic model by actually obtaining the product of the probability of the event slot and the probability of the shared argument in a similar manner as that illustrated in FIG. 2. The technique described in the document thus does not eliminate the problem of a lack of learning data, and in fact, the technique tends to make the problem more serious.

The script model construction method in the embodiment produces the case example data in which the feature values about the history of the shared argument are included in the dimensions of the feature vector and constructs the script model by performing machine learning based on the discriminative model using the case example data, thereby making it possible to eliminate the lack of learning data and to construct the script model with high accuracy.

First Embodiment

Figure 3:
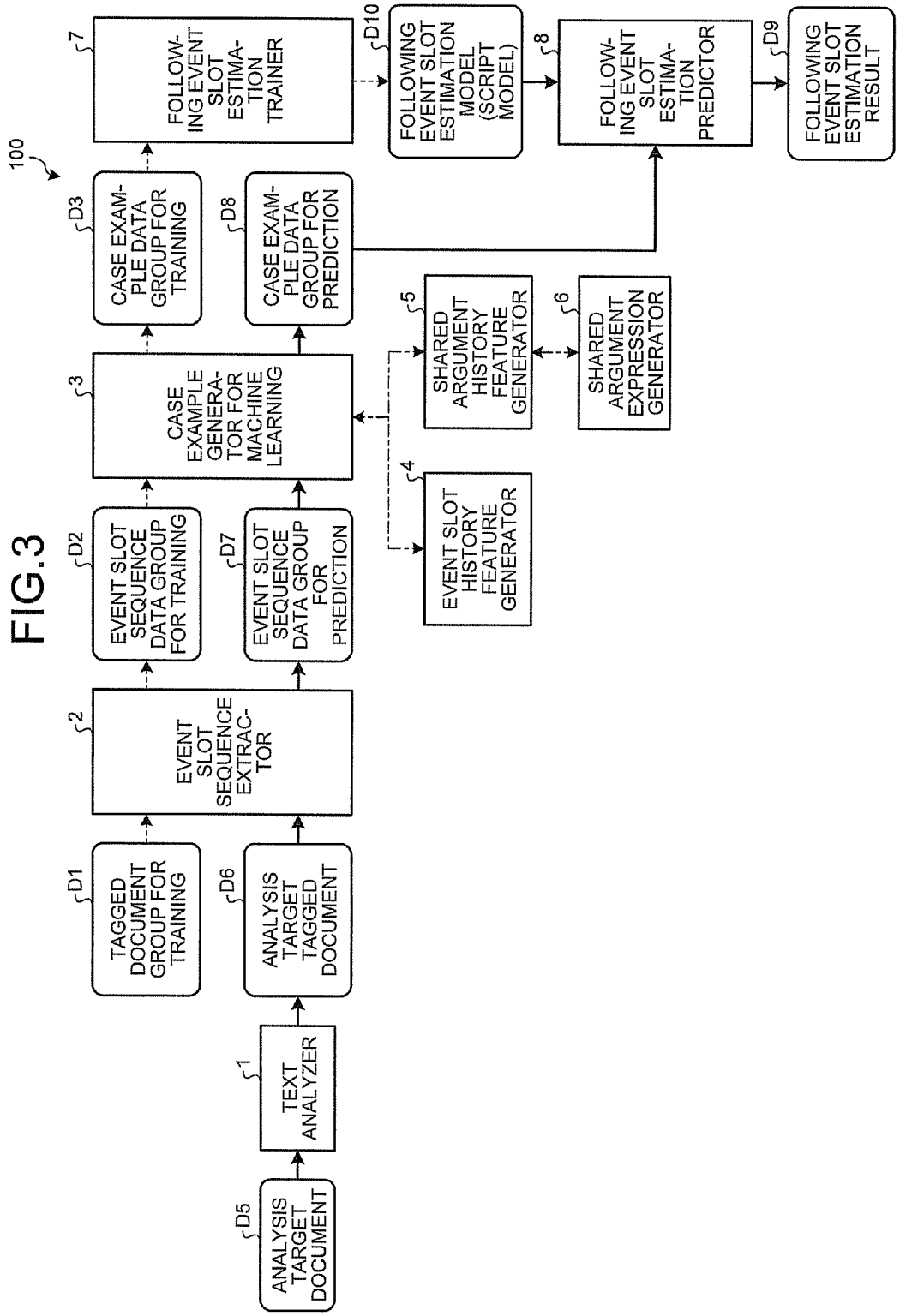
FIG. 3 is a block diagram illustrating an exemplary structure of a data processing device according to a first embodiment.

The following describes a specific example of a data processing device according to an embodiment. FIG. 3 is a block diagram illustrating an exemplary structure of a data processing device 100 according to a first embodiment. As illustrated in FIG. 3, the data processing device 100 includes a text analyzer 1, an event slot sequence extractor 2, a case example generator for machine learning 3 (hereinafter, simply referred to as a case example generator 3), an event slot history feature generator 4, a shared argument history feature generator 5, a shared argument expression generator 6, a following event slot estimation trainer 7 (which may be referred to as a model constructor), and a following event slot estimation predictor 8. The rounded corner squares in FIG. 3 represent input output data of the respective modules 1 to 8 included in the data processing device 100.

The processing performed by the data processing device 100 is roughly classified into "training processing" and "prediction processing". In the training processing, a following event slot estimation model D10 (script model) is structured from a tagged document group for training D1 using the event slot sequence extractor 2, the case example generator 3, the event slot history feature generator 4, the shared argument history feature generator 5, the shared argument expression generator 6, and the following event slot estimation trainer 7. In the prediction processing, the following event slot of an analysis target document D5 is estimated using the text analyzer 1, the event slot sequence extractor 2, the case example generator 3, the event slot history feature generator 4, the shared argument history feature generator 5, the shared argument expression generator 6, the following event slot estimation predictor 8, and the following event slot estimation model D10 constructed by the training processing. In FIG. 3, the dotted arrows represent the processing flows in the training processing, the solid arrows represent the processing flows in the prediction processing, and the long and short dashed-line arrows represent the processing flows in common with the training processing and the prediction processing.

The outline of the training processing is described below. When the data processing device 100 performs the training processing, the tagged document group for training D1 is input to the event slot sequence extractor 2. The event slot sequence extractor 2 receives the tagged document group for training D1, extracts an event slot sequence from a tagged document for training included in the tagged document group for training D1, and outputs an event slot sequence data group for training D2.

The case example generator 3 receives the event slot sequence data group for training D2, produces the case example data from the event slot sequence data for training included in the event slot sequence data group for training D2 in cooperation with the event slot history feature generator 4, the shared argument history feature generator 5, and the shared argument expression generator 6, and outputs a case example data group for training D3.

The following event slot estimation trainer 7 receives the case example data group for training D3, performs training of machine learning using the case example data group for training D3, and outputs the following event slot estimation model D10. The following event slot estimation model D10, which is a script model, is used for estimating the following event slot of the analysis target document D5 in the prediction processing, which is described below.

The outline of the prediction processing is described below. When the data processing device 100 performs the prediction processing, the analysis target document D5 is input to the text analyzer 1. The text analyzer 1 receives the analysis target document D5, performs the predicate argument structure analysis and the coreference resolution on the analysis target document D5, and outputs an analysis target tagged document D6.

The event slot sequence extractor 2 receives the analysis target tagged document D6, extracts the event slot sequence from the analysis target tagged document D6, and outputs an event slot sequence data group for prediction D7.

The case example generator 3 receives the event slot sequence data group for prediction D7, produces the case example data from the event slot sequence data for prediction included in the event slot sequence data group for prediction D7 in cooperation with the event slot history feature generator 4, the shared argument history feature generator 5, and the shared argument expression generator 6, and outputs a case example data group for prediction D8.

The following event slot estimation predictor 8 receives the case example data group for prediction D8 and the following event slot estimation model D10 constructed by the training processing, predicts the following event slot using the following event slot estimation model D10, and outputs a following event slot estimation result D9. In the following event slot estimation result D9, probabilities of the respective event slots that may appear as the following event slot following the event slot sequence extracted from the analysis target document D5 are indicated. Any applications that use the script model can use the information about the following event slot estimation result D9 as determination material for understanding context in their processing.

The following describes the details of the respective modules used for the training processing with specific examples of the training processing.

The event slot sequence extractor 2 is described below. In the training processing, the event slot sequence extractor 2 receives the tagged document group for training D1 and outputs the event slot sequence data group for training D2, as described above.

FIG. 4 illustrates a specific example of the tagged document for training, which is a part of the tagged document group for training D1 received by the event slot sequence extractor 2. In FIG. 4, (a) illustrates an example in Japanese while (b) illustrates an example in English. As illustrated in FIG. 4, the tagged document for training includes text to which morphological (word segmentation) information is added, anaphora-resolved predicate argument structure analysis information after an anaphoric relation such as zero anaphora or pronoun anaphora is resolved, and coreference resolution information. In the first embodiment, the predicate argument structure analysis information and the coreference resolution information are indispensable. The format of the tagged document for training required for being processed is, however, not limited to those illustrated in FIG. 4. The tagged document for training expressed in any format can be used that includes the predicate argument structure analysis information and the coreference resolution information. The example in Japanese in (a) in FIG. 4 and the example in English in (b) in FIG. 4 differ from each other due to the languages, but the data of the examples do not essentially differ from each other. Thus, the following description is made using only the example in Japanese.

In the tagged document for training illustrated in (a) in FIG. 4, the text is segmented into words with anaphoric numbers allocated for the respective words in a section of テキストと形態素解析（単語分割）情報 (corresponding to "text and word-segmentation info" in (b) in FIG. 4). In a section of 照応解決済の述語項構造情報 (corresponding to "anaphora-resolved predicate-argument-structure info" in (b) in FIG. 4)", information about the predicate argument structure of each predicate is indicated with an ID allocated for the predicate after the arguments omitted in the text are complemented by anaphora resolution (the anaphora-resolved status). The predicate argument structure of each predicate includes the anaphoric number and the word sense of the predicate, and the types of cases and the anaphoric numbers of the respective arguments subordinated to the predicate. In the example illustrated in (a) in FIG. 4, the "ga kaku (Agent)" and the "wo kaku (Object)" of the predicate having anaphoric number 12 and "ga kaku (Agent)" and the "wo kaku (Object)" of the predicate having anaphoric number 15 are the arguments resolved by the anaphora resolution. In a section of 共参照情報 (corresponding to "coreference info" in (b) in FIG. 4), for each noun phrase group (hereinafter described as a coreference cluster) that is regarded as being in a coreference relation in the text, members of the coreference cluster are indicated in association with the predicate argument structure. The coreference clusters have respective allocated IDs.

The tagged document for training as exemplified in (a) in FIG. 4 may be produced by adding, to any text, a tag of an analysis result using the text analyzer 1 (or a module having a function equivalent to that of the text analyzer 1) used in the prediction processing, which is described later, or manually adding the tag to any text.

Figure 5:
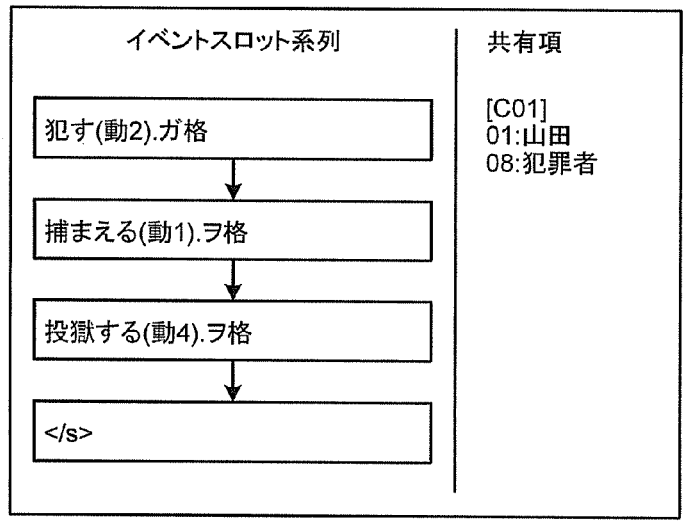
FIG. 5 is a schematic diagram illustrating a specific example of event slot sequence data for training.

FIG. 5 is a schematic diagram illustrating a specific example of the event slot sequence data for training, which is a part of the event slot sequence data group for training D2 output by the event slot sequence extractor 2. FIG. 5 illustrates an example of the event slot sequence data for training extracted from the tagged document for training illustrated in (a) in FIG. 4. In the left side section of the event slot sequence data for training illustrated in FIG. 5, the event slot sequence is illustrated in which the element of "</s>" is added to the last of the event slot sequence. The respective event slots in the sequence share the argument. The information about the shared argument is indicated in the right side section. The element of "</s>" added to the last of the sequence is a pseudo event slot that indicates the end of the sequence and is used for learning the sequence pattern that can be readily ended.

The event slot sequence data for training as illustrated in FIG. 5 is produced from the tagged document for training illustrated in (a) in FIG. 4 by the number of coreference clusters. FIG. 5 illustrates the example where the event slot sequence data for training is produced in relation to the coreference cluster indicated by ID [C01] from the tagged document for training illustrated in (a) in FIG. 4. In addition, from the tagged document for training illustrated in (a) in FIG. 4, the event slot sequence data for training is produced in relation to the coreference cluster indicated by ID [C02] in the same manner as that illustrated in FIG. 5.

Figure 6:
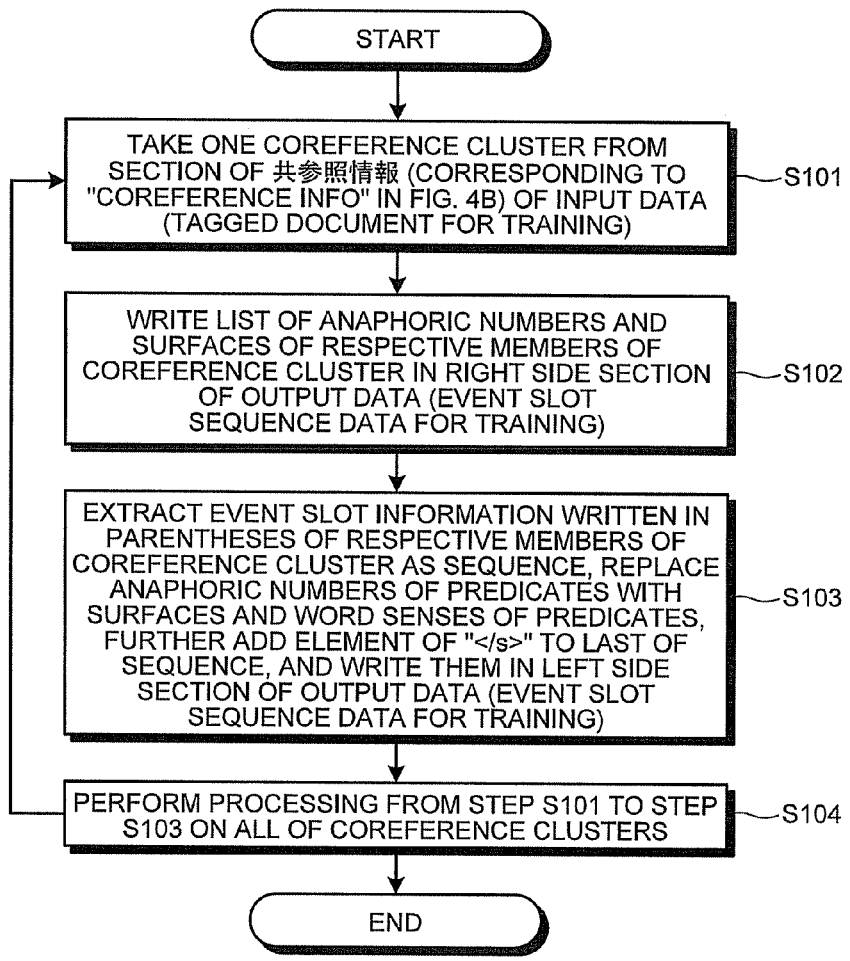
FIG. 6 is a flowchart explaining processing performed by an event slot sequence extractor.

FIG. 6 is a flowchart explaining the processing performed by the event slot sequence extractor 2. The event slot sequence extractor 2 performs the following processing from step S101 to step S104 on each tagged document for training (refer to (a) in FIG. 4) included in the received tagged document group for training D1, produces the event slot sequence data for training (refer to FIG. 5), thereby outputting the event slot sequence data group for training D2. The processing performed by the event slot sequence extractor 2 exemplified in FIG. 6 is an example where the event slot sequence data for training having the format exemplified in FIG. 5 is produced from the tagged document for training having the format exemplified in (a) in FIG. 4. When the format of the tagged document for training differs from the example illustrated in (a) in FIG. 4 or the format of the event slot sequence data for training differs from the example illustrated in FIG. 5, the event slot sequence extractor 2 may perform the processing in accordance with the respective formats.

At step S101, the event slot sequence extractor 2 takes one of the coreference clusters from the section of 共参照情報 (corresponding to "coreference info" in (b) in FIG. 4) of the tagged document for training serving as the input data.

At step S102, the event slot sequence extractor 2 writes a list of the anaphoric numbers and the surfaces of the respective members of the coreference cluster in the right side section of the event slot sequence data for training serving as the output data.

At step S103, the event slot sequence extractor 2 extracts the information (event slot information) written in the parentheses of the respective members of the coreference cluster as a sequence, replaces the anaphoric numbers of the predicates with the surfaces and the word senses of the predicates, further adds the element, of "</s>" to the last of the sequence, and writes them in the left side section of the event slot sequence data for training serving as the output data.

At step S104, the event slot sequence extractor 2 performs the processing from step S101 to step S103 on all of the coreference clusters written in the section of 共参照情報 (corresponding to "coreference info" in (b) in FIG. 4) of the tagged document for training.

The case example generator 3 is described below. The following describes the role of the case example generator 3 in the data processing device 100 according to the first embodiment. In the data processing device 100 according to the first embodiment, machine learning processing performed by the following event slot estimation trainer 7 and the following event slot estimation predictor 8 aims to predict a probability of the Ngram sequence on the basis of the discriminative model. Let y be the event slot and x be the history of the event slot sequence, P (y|x) is a probability to be predicted. Most likelihood estimation is used for the optimization. It is, thus, necessary to preliminarily produce a set of x and y expressed for the machine learning as the case example data. The case example generator 3 plays a role to perform processing to produce the case example data.

The case example generator 3 receives the event slot sequence data group for training D2 from the event slot sequence extractor 2 as input and outputs the case example data group for training D3, as described above.

FIG. 7 is a schematic diagram illustrating a specific example of the case example data for training, which is a part of the case example data group for training D3 output by the case example generator 3. FIG. 7 illustrates an example of the case example data for training produced from the event slot sequence data for training illustrated in FIG. 5. The case example data for training illustrated in FIG. 7 is based on that the order of Ngram is two (bigram) and 投獄する (動4). ヲ格 (corresponding to imprison(v3).Object) in the event slot sequence data for training illustrated in FIG. 5 is the attention element.

In the case example data for training illustrated in FIG. 7, the output label is described in the section starting with "y:". The output label represents the event slot that becomes a correct solution in the prediction processing that predicts the following event slot.

In the case example data for training illustrated in FIG. 7, the feature vector corresponding to the information about clues for predicting the following event slot in the section starting with "x:". The feature vector includes elements (dimensions) each separated with comma. Each element is separated with colon. The left side of the colon indicates a dimension ID that identifies the dimension while the right side of the colon indicates a value (feature value) of the dimension. The value of the feature element dimension that is not designated is regarded as zero. This notation system is often used for expressing, in compact form, a high dimensional sparse vector almost elements of which are zero frequency. The dimension ID, which is represented in character string, is used for determining whether elements included in the feature vectors of different case examples belong to the same dimension. When the vector needs to be mathematically interpreted in the following machine learning processing, the respective dimension IDs are appropriately allocated to different vector element numbers (the result of the optimization is the same when the respective dimension IDs are allocated to any element numbers of the mathematical vector). In the first embodiment, the value of the feature element dimension is either one or zero.

The feature vector includes one or more feature values about the history of the event slot and one or more feature values about the history of the shared argument, as described above. In the example illustrated in FIG. 7, the value corresponding to the dimension ID starting with "[EventSlot]" is the feature value about the history of the event slot (hereinafter described as an event slot history feature) while the value corresponding to the dimension ID starting with "[ShareArg]" is the feature value about the history of the shared argument (hereinafter described as a shared argument history feature). Let the order of Ngram be i, the event slot history feature and the shared argument history feature are produced for all of the Ngram sequences having an order equal to or smaller than i. For example, in the example illustrated in FIG. 7, the history feature of the bigram sequence and the history feature of the unigram sequence are produced because the order of Ngram is two. As a result, a smoothing effect is obtained by using the unigram sequence for complement when the frequency of the bigram sequence is zero. The feature vector may be used that includes either the event slot history feature or the shared argument history feature.

Figure 8:
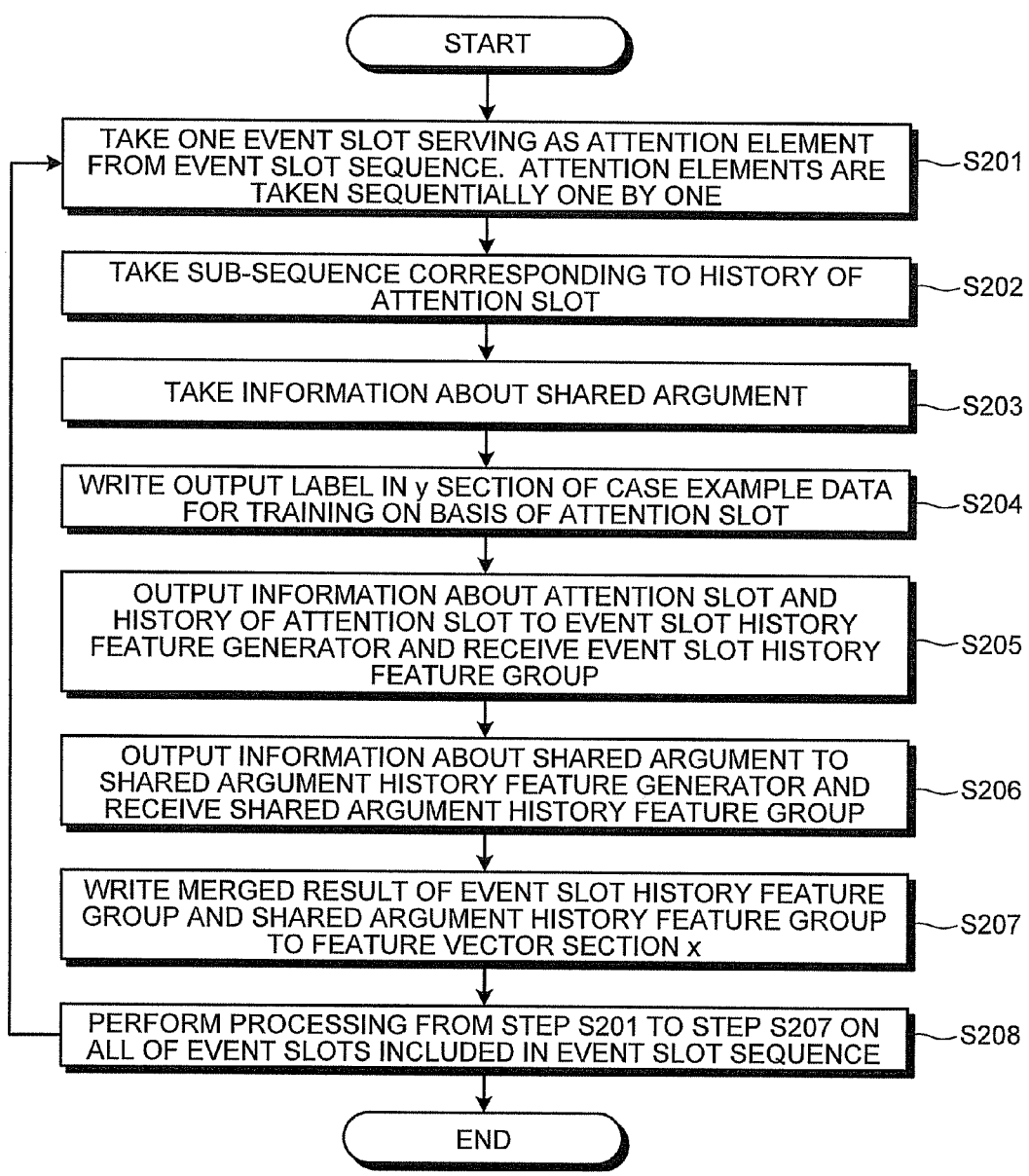
FIG. 8 is a flowchart explaining processing performed by a case example generator.

FIG. 8 is a flowchart explaining the processing performed by the case example generator 3. The case example generator 3 performs the following processing from step S201 to step S208 on each event slot sequence data for training included in the received event slot sequence data group for training D2 (refer to FIG. 5) to produce the case example data for training (refer to FIG. 7), and outputs the case example data group for training D3.

At step S201, the case example generator 3 takes one event slot serving as the attention element (hereinafter described as an attention slot) from the event slot sequence written in the left side section of the event slot sequence data for training serving as the input data. The attention slots are sequentially taken one by one from the event slot sequence.

At step S202, the case example generator 3 takes the sub-sequence corresponding to the history of the attention slot from the event slot sequence. For example, in bigram, the sub-sequence including the attention slot and the event slot before the attention slot is taken while in trigram, the sub-sequence including the attention slot and two event slots before the attention slot is taken. When the event slot serving as the attention element is written near the head of the event slot sequence and the length satisfying the order of Ngram is not obtained, dummy elements such as "<s>" may be added to the head by the number of lacking event slots.

At step S203, the case example generator 3 takes the information about the shared argument written in the right side section of the event slot sequence data.

At step S204, the case example generator 3 writes, on the basis of the description of the attention slot, the output label in the section starting with "y:" in the case example data for training serving as the output data. The description of the attention slot becomes the output label without any change.

At step S205, the case example generator 3 outputs the information about the attention slot and the history of the attention slot to the event slot history feature generator 4, and receives an event slot history feature group from the event slot history feature generator 4. In the example of the case example data for training illustrated in FIG. 7, the value corresponding to the dimension ID starting with "[EventSlot]" is the event slot history feature. The case example generator 3 acquires, from the event slot history feature generator 4, the event slot history feature group that includes the event slot history features.

At step S206, the case example generator 3 outputs the information about the shared argument to the shared argument history feature generator 5, and receives a shared argument history feature group from the shared argument history feature generator 5. In the example of the case example data for training illustrated in FIG. 7, the value corresponding to the dimension ID starting with "[ShareArg]" is the shared argument history feature. The case example generator 3 acquires, from the shared argument history feature generator 5, the shared argument feature group that includes the shared argument history features.

At step S207, the case example generator 3 writes, as the feature vector, the merged result of the event slot history feature group and the shared argument history feature group thus acquired in the section starting with "x:" in the case example data for training serving as the output data.

At step S208, the case example generator 3 performs the processing from step S201 to step S207 on all of the event slots included in the event slot sequence described in the left side section of the event slot sequence data.

The event slot history feature generator 4 is described below. The event slot history feature generator 4 receives the information about the attention slot and the history of the attention slot from the case example generator 3 as input, and returns the event slot history feature group to the case example generator 3.

Figure 9:
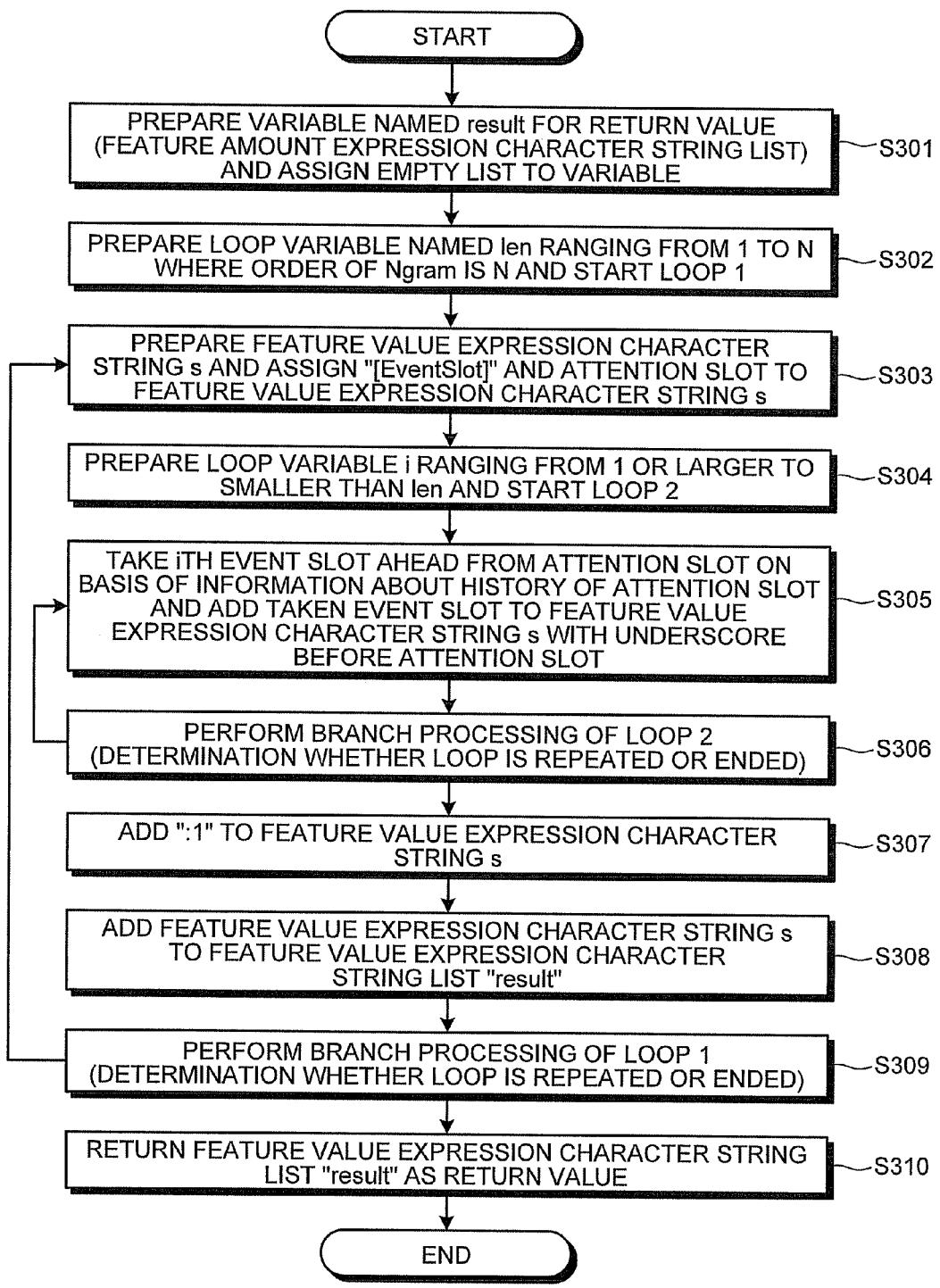
FIG. 9 is a flowchart explaining processing performed by an event slot history feature generator.

FIG. 9 is a flowchart explaining the processing performed by the event slot history feature generator 4. When receiving the information about the attention slot and the history of the attention slot from the case example generator 3, the event slot history feature generator 4 performs the processing from step S301 to step S310 in FIG. 9 and returns the event slot history feature group to the case example generator 3.

At step S301, the event slot history feature generator 4 prepares a variable named "result" for a return value (feature value expression character string list) and assigns an empty list to the variable "result".

At step S302, the event slot history feature generator 4 prepares a loop variable named "len" ranging from 1 to N where the order of Ngram is N, and starts loop 1.

At step S303, the event slot history feature generator 4 prepares a feature value expression character string s and assigns "[EventSlot]" and the attention slot to the feature value expression character string s.

At step S304, the event slot history feature generator 4 prepares a loop variable "i" ranging from 1 to len, and starts loop 2.

At step S305, the event slot history feature generator 4 takes the ith event slot ahead from the attention slot, on the basis of the information about the history of the attention slot, and adds the taken event slot to the feature value expression character string s with underscore before the attention slot.

At step S306, the event slot history feature generator 4 performs branch processing of loop 2 (determination whether the loop is repeated or ended).

At step S307, the event slot history feature generator 4 adds ":1" to the feature value expression character string s.

At step S308, the event slot history feature generator 4 adds the feature value expression character string s to a feature value expression character string list "result".

At step S309, the event slot history feature generator 4 performs branch processing of loop 1 (determination whether the loop is repeated or ended).

At step S310, the event slot history feature generator 4 returns the feature value expression character string list "result" as the return value.

The shared argument history feature generator 5 is described below. The shared argument history feature generator 5 receives the information about the shared argument from the case example generator 3 as input and returns the shared argument history feature group to the case example generator 3.

FIG. 10 is a flowchart explaining the processing performed by the shared argument history feature generator 5. When receiving the information about the shared argument from the case example generator 3, the shared argument history feature generator 5 performs the processing from step S401 to step S413 in FIG. 10 and returns the shared argument history feature group to the case example generator 3.

At step S401, the shared argument history feature generator 5 prepares the variable "result" for a return value (feature value expression character string list) and assigns an empty list to the variable "result".

At step S402, the shared argument history feature generator 5 outputs the information about the shared argument to the shared argument expression generator 6 to call the shared argument expression generator 6, and receives a shared argument expression group from the shared argument expression generator 6.

At step S403, the shared argument history feature generator 5 sequentially takes shared argument expressions one by one from the shared argument expression group, and performs the following processing (loop 1).

At step S404, the shared argument history feature generator 5 prepares the loop variable "len" ranging from 1 to N where the order of Ngram is N, and starts loop 2.

At step S405, the shared argument history feature generator 5 prepares the feature value expression character string s and assigns "[ShareArg]" and the shared argument expression to the feature value expression character string s.

At step S406, the shared argument history feature generator 5 prepares the loop variable "i" ranging from 1 to len, and starts loop 3.

At step S407, the shared argument history feature generator 5 adds the shared argument expression to the feature value expression character string s with underscore before the assigned shared argument expression.

At step S408, the shared argument history feature generator 5 performs branch processing of loop 3 (determination whether the loop is repeated or ended).

At step S409, the shared argument history feature generator 5 adds ":1" to the feature value expression character string s.

At step S410, the shared argument history feature generator 5 adds the feature value expression character string s to the feature value expression character string list "result".

At step S411, tha shared argument history feature generator 5 performs branch processing of loop 2 (determination whether the loop is repeated or ended).

At step S412, the shared argument history feature generator 5 performs branch processing of loop 1 (determination whether the loop is repeated or ended).

At step S413, the shared argument history feature generator 5 returns the feature value expression character string list "result" as the return value.

The shared argument expression generator 6 is described below. The shared argument expression generator 6 receives the information about the shared argument from the shared argument history feature generator 5 as input and returns the shared argument expression group to the shared argument history feature generator 5.

FIG. 11 is a schematic diagram illustrating an example of the shared argument expression group produced by the shared argument expression generator 6. FIG. 11 illustrates an example of the shared argument expression group produced when the information about the shared argument included in the event slot sequence data exemplified in FIG. 5 is input to the shared argument expression generator 6. As illustrated in FIG. 11, the shared argument expression group produced by the shared argument expression generator 6 includes, in addition to the surface (or may be a normalized surface) of the shared argument, an expression using the result of named entity recognition and expressions by a semantic category. Besides those expressions, a word class (e.g., a common noun, a proper noun, or a singular noun) may be added to one of expressions of the shared argument. The addition of the word class to the expression of the shared argument makes it possible to handle a tendency in the shared argument on a word class basis. Any shared argument expression may be used that discriminates the shared arguments from one another using at least one of the surface or the normalized surface, the information about the grammatical category, the information about the semantic category, and the information about the named entity type.

FIG. 12 is a flowchart explaining the processing performed by the shared argument expression generator 6. When receiving the information about the shared argument from the shared argument history feature generator 5, the shared argument expression generator 6 performs the processing from step S501 to step S507 in FIG. 12 and returns the shared argument expression group to the shared argument history feature generator 5.

At step S501, the shared argument expression generator 6 prepares the variable "result" for a return value (shared argument expression list) and assigns an empty list to the variable "result".

At step S502, the shared argument expression generator 6 sequentially takes surfaces from a surface group one by one, and performs the following processing (loop 1).

At step S503, the shared argument expression generator 6 adds the surface to the feature value expression character string list "result".

At step S504, the shared argument expression generator 6 performs named entity recognition processing on the basis of the surface and adds the obtained named entity type to the feature value expression character string list "result". The named entity recognition identifies the type of named entity such as PERSON, ORGANIZATION, or LOCATION.

At step S505, the shared argument expression generator 6 identifies the semantic category of the surface using thesaurus, for example, and adds the obtained semantic category to the feature value expression character string list "result" in accordance with hierarchy.

At step S506, the shared argument expression generator 6 performs branch processing of loop 1 (determination whether the loop is repeated or ended).

At step S507, the shared argument expression generator 6 returns the feature value expression character string list "result" as the return value.

The following event slot estimation trainer 7 is described below. The following event slot estimation trainer 7 receives the case example data group for training D3 from the case example generator 3 as input and outputs the following event slot estimation model D10 (script model), as described above.

FIG. 13 is a schematic diagram illustrating an example of the following event slot estimation model D10. In the following event slot estimation model D10 illustrated in FIG. 13, the rows correspond to the feature vectors of respective classes and are arranged in order of class numbers. The class is equivalent to the output label y and the class number corresponds to the output label y. In the following event slot estimation model D10 illustrated in FIG. 13, fields in the row are the respective elements (dimensions) of the feature vector and are ranged in order of dimension numbers. The dimension number corresponds to the dimension ID. The following event slot estimation model D10 output by the following event slot estimation trainer 7 actually has a huge data size. The following event slot estimation model D10 having a small dimension number and a small class number is exemplified in FIG. 13 for expository convenience.

FIG. 14 is a flowchart explaining the processing performed by the following event slot estimation trainer 7. The following event slot estimation trainer 7 performs the following processing from step S601 to step S604 using the received case example data group for training D3 to produce the following event slot estimation model D10 serving as the script model, and outputs the following event slot estimation model D10.

At step S601, the following event slot estimation trainer 7 allocates the output labels y included in the received case example data group for training D3 to numbers (class numbers) different from one another.

At step S602, the following event slot estimation trainer 7 allocates the dimension IDs of the feature values included in the received case example data group for training D3 to numbers (dimension numbers) different from one another.

At step S603, the following event slot estimation trainer 7 solves the optimization formula of logistic regression represented by Expression (1). The following event slot estimation trainer 7 obtains a weight vector group $w^{(c)}$, where $c_\epsilon Y$, that minimizes an objective function L.

$$\min L(\{w^{(c)}\}_{c \in y}) \equiv \frac{1}{N} \sum_{i=1}^{N} \log P(y^{(i)} | x^{(i)}; \{w^{(c)}\}_{c \epsilon y}) - \lambda \sum_{c \in y} \|w^{(c)}\|_2^2 \quad (1)$$

where Y={1, 2, . . . , C} is the set of class, $\phi(x)$ is the feature vector x extracted from x, $\lambda$ is any constant, N is the number of case examples, and (x(i), y(i)) is the ith case example. The likelihood of case example (x, y) is defined as Expression (2).

$$P(y | x; \{w^{(c)}\}_{c \in y}) \equiv \frac{\exp(w^{(y)T} \phi(x))}{\sum_{c \in y} \exp(w^{(c)T} \phi(x))} \quad (2)$$

At step S604, the following event slot estimation trainer 7 outputs the weight vector group $w^{(c)}$ (where $c_\epsilon Y$), which is obtained by solving the optimization formula represented by Expression (1), as the following event slot estimation model D10.

The following describes the details of the respective modules used for performing the prediction processing to estimate the following event slot using the following event slot estimation model D10 thus produced.

The text analyzer 1 is described below. In the prediction processing, the analysis target document D5 is input to the text analyzer 1, as described above. The text analyzer 1 performs the morphological analysis, the predicate argument structure analysis, and the coreference resolution on the received analysis target document D5, for example, to produce the analysis target tagged document D6 having the same format as the tagged document for training exemplified in (a) in FIG. 4, and outputs the analysis target tagged document D6. The morphological analysis, the predicate argument structure analysis, and the coreference resolution performed by the text analyzer 1 are known techniques, and thus the description thereof is omitted.

The event slot sequence extractor 2 is described below. In the prediction processing, the event slot sequence extractor 2 receives, as input, the analysis target tagged document D6 output by the text analyzer 1 and outputs the event slot sequence data group for prediction D7. The processing performed by the event slot sequence extractor 2 in the prediction processing is the same as that performed in the training processing. The event slot sequence data group for prediction D7 includes a group of event slot sequence data for prediction having the same format as the event slot sequence data for training exemplified in FIG. 5.

The following describes setting of a problem to be predicted in the prediction processing. In general, the setting of a problem to be predicted differs from application to application. When the prediction processing is applied to dialog processing, it is appropriate to set a problem of estimating the event slot that may follow a given document and the probability of the following event slot. When the prediction processing is applied to zero anaphora resolution in Japanese, for example, it is appropriate to set a problem of selecting the event slot sequence such that an omitted argument (a pronoun in case of pronoun resolution of English or the like) of a predicate in a document is the most coherent with the previous context. In the first embodiment, the description is free from applications. Thus, it is set to solve a problem of estimating the following event slot most coherent with a given event slot sequence (or a case where no following event slot is present) and the probability of the following event slot, as a simple setting. It is assumed that any event slot sequence data is already selected from the event slot sequence data group for prediction D7 output by the event slot sequence extractor 2 as the given event slot sequence, and thus how to select the event slot sequence is not discussed.

The case example generator 3 is described below. In the prediction processing, the case example generator 3 receives, as input, the event slot sequence data group for prediction D7 output by the event slot sequence extractor 2, produces the case example data for prediction from the selected event slot sequence data, and outputs the case example data group for prediction D8. The case example data for prediction has the same format as the case example data for training exemplified in FIG. 7 but only differs from case example data for training in that the output label y is indeterminate.

FIG. 15 is a flowchart explaining the processing performed by the case example generator 3 in the prediction processing. The case example generator 3 performs the following processing at step S701 and step S702 on the event slot sequence data for prediction selected from the received event slot sequence data group for prediction D7 to produce the case example data for prediction, and outputs the case example data group for prediction D8.

At step S701, the case example generator 3 removes the last element of "</s>" from the event slot sequence written in the left side section of the event slot sequence data for prediction.

At step S702, the case example generator 3 regards the remaining event slot sequence as the history, performs the processing in the same manner as step S202, step S203, and from step S205 to step S208 in FIG. 8, and outputs the case example data group for prediction D8. In the prediction processing, the output label y of the case example data for prediction is indeterminate. The corresponding section remains empty or is filled with a dummy value.

The following event slot estimation predictor 8 is described below. The following event slot estimation predictor 8 receives, as input, the case example data group for prediction D8 output by the case example generator 3, performs the prediction processing by machine learning using the following event slot estimation model D10 constructed in the training processing, and outputs the following event slot estimation result D9.

FIG. 16 is a schematic diagram illustrating an example of the following event slot estimation result D9. In the following event slot estimation result D9 illustrated in FIG. 16, the conditional probabilities $P(c|x)$, where $c_\epsilon Y$, of the respective classes are listed in order of class numbers. The probability of each class indicates a possibility that the event slot follows the given event slot sequence.

Figure 17:
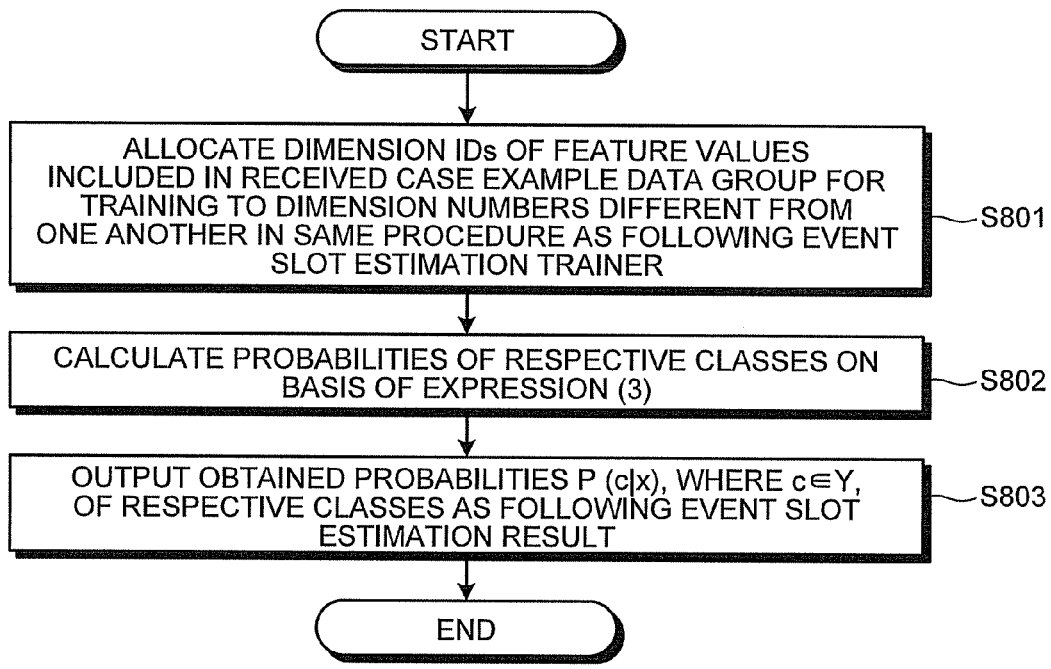
FIG. 17 is a flowchart explaining processing performed by a following event slot predictor.

FIG. 17 is a flowchart explaining the processing performed by the following event slot estimation predictor 8. The following event slot estimation predictor 8 performs the following processing from step S801 to step S803 on the received case example data group for prediction D8 using the following event slot estimation model D10 and outputs the following event slot estimation result D9.

At step S801, the following event slot estimation predictor 8 allocates the dimension IDs of the feature values included in the received case example data group for prediction D8 to numbers (dimension numbers) different from one another in the same procedure (in the same manner as step S602 in FIG. 14) as the following event slot estimation trainer 7.

At step S802, the following event slot estimation predictor 8 calculates the probabilities of the respective classes on the basis of the estimation formula of logistic regression represented by Expression (3).

$$P(y \mid x; \{w^{(c)}\}_{c \in y}) \equiv \frac{\exp(w^{(y)T}\phi(x))}{\sum_{c \in y} \exp(w^{(c)T}\phi(x))} \quad (3)$$

where $Y=\{1, 2, \ldots, C\}$ is the set of class, and $\phi(x)$ is the feature vector extracted from x.

At step S803, the following event slot estimation predictor 8 outputs the probabilities $P(c|x)$, where $c_\epsilon Y$, of the respective classes obtained by Expression (3) as the following event slot estimation result D9.

As described above in detail with reference to specific examples, in the data processing device 100 according to the first embodiment, the event slot sequence extractor 2 (extractor) extracts the event slot sequence data for training from the tagged document for training. The tagged document for training has been subjected to the predicate argument structure analysis and the coreference resolution. The event slot sequence data for training includes the element sequence in which the multiple elements are arranged in order of appearances of predicates in the document and the shared argument. The element is the combination of the predicate having the shared argument and the case type information indicating the type of case of the shared argument. The case example generator 3 produces, from the event slot sequence data for training, the case example data for training that is the combination of the feature vector x including the event slot history feature and the shared argument history feature, and the output label y. The case example data for training is produced for each attention element, which is one of the elements included in the element sequence, and includes the feature vector. The feature vector includes one or more feature values about the sub-sequence having the attention element as the last element in the element sequence, and one or more feature values about the number of shared arguments corresponding to the number of elements included in the sub-sequence. The following event slot estimation trainer 7 constructs the following event slot estimation model D10 (script model) by solving the optimization formula of logistic regression represented by Expression (1) (performing machine learning based on the discriminative model) using the case example data for training. The data processing device 100 according to the first embodiment produces the case example data expressed by the feature vector including not only the event slot history feature but also the shared argument history feature, and constructs the script model by machine learning using the case example data, thereby extracting further clues for predicting the following event slot than those in the conventional techniques. As a result, the script model can be constructed with high accuracy.

In the data processing device 100 according to the first embodiment, the case example generator 3 produces the shared argument history feature for each shared argument expression discriminating the shared argument using at least one of the surface or the normalized surface, the information about the grammatical category, the information about the semantic category, and the information about named entity type in cooperation with the shared argument history feature generator 5 and the shared argument expression generator 6, when producing the case example data for training and the case example data for prediction. The data processing device 100 according to the first embodiment, thus, produces the shared argument history feature with an appropriate granularity, thereby making it possible to construct the script model with high accuracy.

In the data processing device 100 according to the first embodiment, the case example generator 3 produces the event slot history feature and the shared argument history feature for each of the sub-sequences including the unigram sequence, when producing the case example data for training and the case example data for prediction. The data processing device 100 according to the first embodiment, thus, effectively solves the zero probability, in which the probability of the event slot sequence is zero, thereby making it possible to construct the script model with high accuracy.

In the data processing device 100 according to the first embodiment, the word sense identification information that identifies the word sense of the predicate is added to the predicate included in each event slot in the event slot sequence extracted by the event slot sequence extractor 2. The data processing device 100 according to the first embodiment, thus, eliminates the word sense ambiguity of the predicate, thereby making it possible to construct the script model with high accuracy.

Second Embodiment

The following describes a second embodiment. In the second embodiment, a combination feature value is used instead of the shared argument history feature used in the first embodiment. The combination feature is the combination of the shared argument and a wild card history that has a function involving the shared argument history feature.

The following describes the wild card history. In the wild card history, a part of the elements in the sub-sequence serving as the event slot history in the event slot sequence is replaced with a wild card (element matches with any event slots). When the wild card is applied to a history of "A_B_C" where A, B, and C are event slots appear in this order, and let the wild card be *, the following variations of the wild card history can be listed: "A_B_C" (history including no wild card), "A_B_*" (history in which C is replaced with the wild card), "A_*_C" (history in which B is replaced with the wild card), "A_*_*" (history in which B and C are replaced with the wild cards), "*_B_C" (history in which A is replaced with the wild card), "*_*_C" (history in which A and B are replaced with the wild cards), and "*_*_*" (history in which A, B, and C are replaced with the wild cards). The wild card history of "A_*_*" matches with all of the histories having the element "A" as the third element ahead from the attention element. The wild card history is introduced as a "skipping model" in Goodman and Joshua T, "A bit of progress in language modeling", Computer Speech & Language, volume 15, number 4, pages 403 to 434, Elsevier, 2001. The wild card history is introduced as a "Distance Trigram" in R. Rosenfeld, "Adaptive Statistical Language Modeling: A Maximum Entropy Approach", Ph. D. Thesis, *Technical Report CMU-CS*-94-138, School of Computer Science, Carnegie Mellon University, Pittsburgh, Pa., 114 pages, 1994, and Sven Martin, Christoph Hamacher, Jorg Liermann, Frank Wessel, and Herman Ney, "Assessment of smoothing methods and complex stochastic language modeling, in 6*th European Conference on Speech Communication and Technology*, volume 5, pages 1939 to 1942, Budapest, Hungary, September, 1999.

The history of the shared argument used in the first embodiment is defined by arranging the shared arguments by the length of the history of the event slot (the number corresponding to the number of elements of the sub-sequence serving as the history of the event slot). For example, the history of the shared argument corresponding to the sub-sequence which length is three is expressed "X_X_X" where the shared argument is X. The combination feature is obtained by taking a logical product of the wild card history and the shared argument. The combination feature equals one only when both feature values are one. The dimension ID is represented by connecting both IDs with "&". For example, the combination feature obtained by taking a logical product of the wild card history of "A_*_*" and the shared argument of "X" is represented by "A_*_*". The combination feature indicates that both features of the wild card history of "A_*_*" and the shared argument of "X" are realized.

The attention is paid that the shared argument history feature used in the first embodiment is involved in the combination feature of the wild card history and the shared argument. For example, the shared argument history feature about the history of "X_X_X", which is the history of the shared argument "X" which length is three, has the same meaning as the combination feature "*_*_*&X", which is the combination feature of the wild card history of "*_*_*" and the shared argument "X". Because, the wild card history of "*_*_*" indicates that the history which length is three and "*_*_*&X" indicates that the history which length is three is the history about the shared argument "X".

The combination feature of the wild card history and the shared argument other than "*_*_*" is more slightly restricted than the combination feature described above. For example, "A_*_*&X" should have the history of the shared argument "X" which length is three, and the third element ahead from the attention element in the event slot history should be "X". This example indicates that adjustment can be made such that an appropriate restriction is applied to the event slot sequence by combining another wild card history feature when the restriction by only the shared argument history feature is too loose.

In a data processing device according to the second embodiment, the case example generator 3 uses the combination feature of the wild card history and the shared argument instead of the shared argument history feature used in the first embodiment when producing the case example data for training and the case example data for prediction in the case where the restriction by the shared argument history feature is too loose, thereby achieving adjustment that applies an appropriate restriction to the event slot sequence. Specifically, in the second embodiment, the machine learning is performed while the combination features of all of the variations of the wild card history and the shared argument are included in the feature vector. The machine leaning has an adjustment mechanism that applies a large weight to a significant feature value for prediction and a small weight to an insignificant feature for prediction. Thus, it makes possible to allocate a large weight to the combination feature value of the wild card history and the shared argument and of having an appropriate restriction in a case where the prediction may not be performed sufficiently using only the shared argument history. No special procedures are added to the machine learning processing in the second embodiment. The same machine learning processing as the first embodiment is used in the second embodiment.

The combination feature of the shared argument and the wild card history in which all of the elements are replaced with the wild cards has the same meaning as the shared argument history feature used in the first embodiment, as described above. Thus, the case example data for training and the case example data for prediction produced in the second embodiment have the following feature vector x for each attention element. The feature vector x in the second embodiment includes, as the elements, one or more feature values about the combination of the shared argument and the sub-sequence in which a part of the elements is replaced with the wild card in a logical product manner, in addition to the feature vector of the case example data for training and the case example data for prediction produced in the first embodiment.

Figure 18:
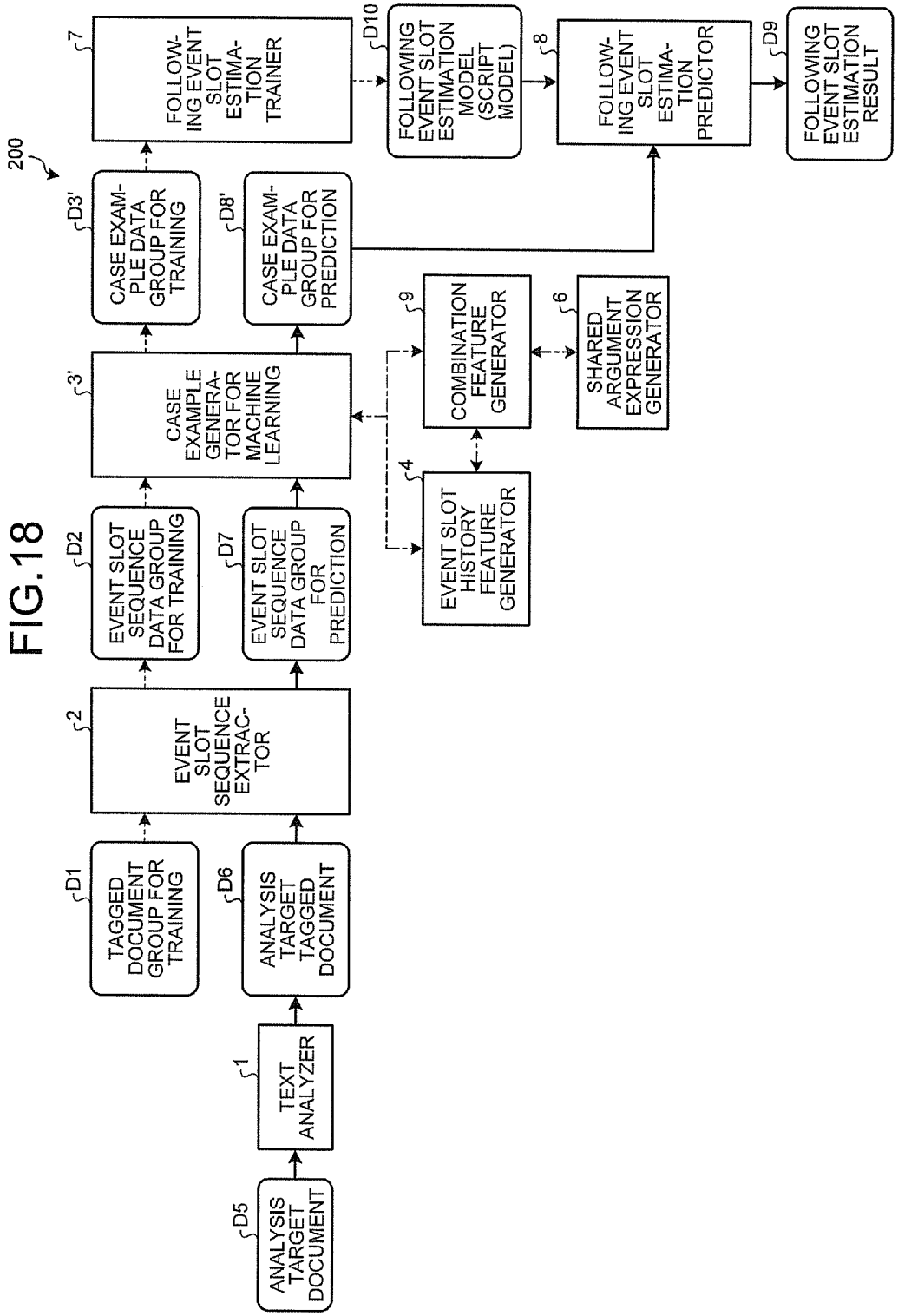
FIG. 18 is a block diagram illustrating an exemplary structure of a data processing device according to a second embodiment.

FIG. 18 is a block diagram illustrating an exemplary structure of a data processing device 200 according to the second embodiment. As illustrated in FIG. 18, the data processing device 200 according to the second embodiment differs from the data processing device 100 according to the first embodiment illustrated in FIG. 3 in that the data processing device 200 uses a case example generator for machine learning 3' (hereinafter, simply referred to as a case example generator 3') instead of the case example generator 3 and a combination feature generator 9 instead of the shared argument history feature generator 5. The other structure of the data processing device 200 according to the second embodiment is the same as that of the data processing device 100 according to the first embodiment. In the following description, the constituting elements having the same functions as the data processing device 100 according to the first embodiment are labeled with the same numerals and the duplicated descriptions thereof are omitted. Only the different points are described.

The case example generator 3' receives the event slot sequence data group for training D2 (or the event slot sequence data group for prediction D7) from the event slot sequence extractor 2 as input, produces the case example data in cooperation with the event slot history feature generator 4, the combination feature generator 9, and the shared argument expression generator 6, and outputs a case example data group for training D3' (or a case example data group for prediction D8').

FIG. 19 is a schematic diagram illustrating a specific example of the case example data for training, which is a part of the case example data group for training D3' output by the case example generator 3'. FIG. 19 illustrates an example of the case example data for training produced from the event slot sequence data for training illustrated in FIG. 5. The case example data for training illustrated in FIG. 19 is based on that the order of Ngram is two (bigram) and 投獄する(動4). ヲ格 (corresponding to "imprison(v3).Object") in the event slot sequence data for training illustrated in FIG. 5 is the attention element.

The case example data for training illustrated in FIG. 19 does not include the shared argument history feature corresponding to the dimension ID starting with "[ShareArg]" in the feature vector x in comparison with the example of the case example data for training illustrated in FIG. 7 in the first embodiment. Instead of the shared argument history feature, the feature vector x includes the combination feature value of the shared argument and the wild card history corresponding to the dimension ID starting with "[Wild&Arg]".

In the case example data for training exemplified in FIG. 19, the wild card history used for the combination feature value of the wild card history and the shared argument has the following four variations:

捕まえる(動1). ヲ格 _ 投獄する(動4). ヲ格 (corresponding to "imprison(v3).Object_arrest(v2).Object");

*投獄する(動4). ヲ格 (corresponding to "*_imprison(v3).Object");

捕まえる(動1). ヲ格 (corresponding to "arrest(v2).Object_*"); and

*_*.

The shared argument used for the combination feature value of the wild card history and the shared argument has the following six variations:

山田 (Yamada, Japanese name);

犯罪者 (criminal in English);

<PERSON>;

<Thing>;

<Thing/Agent>; and

<Thing/Agent/Person>.

As a result, 24 (=4×6) types of combination feature values of the wild card history and the shared argument are produced in total.

In the 24 types of feature values, the combination feature values (6 types) of the shared argument and the wild card history of "*_*" are equivalent to the shared argument history features included in the case example data for training exemplified in FIG. 7 in the first embodiment. Thus, the feature vector x of the case example data for training exemplified in FIG. 19 further includes 18 types feature values in addition to the feature vector x of the case example data for training exemplified in FIG. 7 in the first embodiment.

The case example generator 3' performs the same processing (from step S201 to step S208 in FIG. 8) as the case example generator 3 in the first embodiment on each event slot sequence data for training included in the received event slot sequence data group for training D2 (refer to FIG. 5) to produce the case example data for training illustrated in FIG. 19, and outputs the case example data group for training D3'. The case example generator 3 in the first embodiment outputs the information about the shared argument to the shared argument history feature generator 5 and receives the shared argument history feature group at S206 in FIG. 8. The case example generator 3' in the second embodiment outputs the information about the history of the event slot and the information about the shared argument to the combination feature generator 9 and receives a group of the combination feature values of the wild card history and the shared argument.

In the prediction processing, the case example generator 3' receives, as input, the event slot sequence data group for prediction D7 output by the event slot sequence extractor 2, performs the same processing as the case example generator 3 in the first embodiment (step S701 and step S702 in FIG. 15) on the selected event slot sequence data to produce the case example data for prediction, and outputs the case example data group for prediction D8. The case example data for prediction has the same format as the case example data for training exemplified in FIG. 19 but only differs from case example data for training in that the output label y is indeterminate.

The combination feature generator 9 is described below. The combination feature generator 9 receives the information about the history of the event slot and the information about the shared argument as input and returns the group of the combination features of the wild card history and the shared argument to the case example generator 3'.

Figure 20:
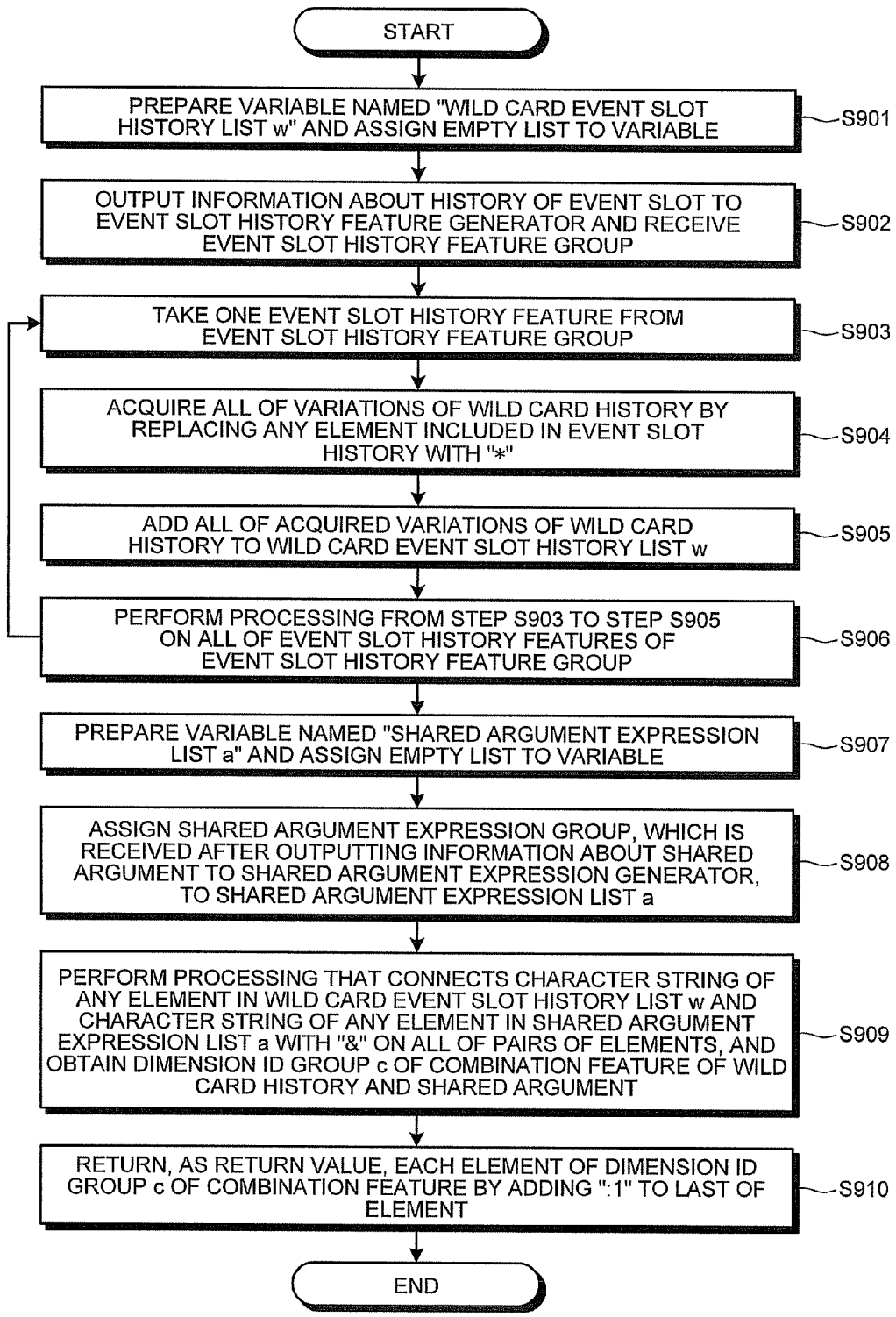
FIG. 20 is a flowchart explaining processing performed by a combination feature generator.

FIG. 20 is a flowchart explaining the processing performed by the combination feature generator 9. When receiving the information about the history of the event slot and the information about the shared argument from the case example generator 3', the combination feature generator 9 performs the processing from step S901 to step S910 in FIG. 20 and returns the group of the combination feature values of the wild card history and the shared argument to the case example generator 3'.

At step S901, the combination feature generator 9 prepares a variable named "wild card event slot history list w" and assigns an empty list to the variable.

At step S902, the combination feature generator 9 outputs the information about the history of the event slot (information about an attention slot and the history of the attention slot) to the event slot history feature generator 4, and receives the event slot history feature group from the event slot history feature generator 4.

At step S903, the combination feature generator 9 takes one event slot history feature from the event slot history feature group.

At step S904, the combination feature generator 9 acquires all of the variations of the wild card history by replacing any element included in the event slot history with "*" (when the length of the event slot history is N, $2^N$ variations are acquired).

At step S905, the combination feature generator 9 adds all of the acquired variations of the wild card history to the wild card event slot history list w.

At step S906, the combination feature generator 9 performs the processing from step S903 to step S905 on all of the event slot history features of the event slot history feature group.

At step S907, the combination feature generator 9 prepares a variable named "shared argument expression list a" and assigns an empty list to the variable.

At step S908, the combination feature generator 9 adds a shared argument expression group, which is received after outputting the information about the shared argument to the shared argument expression generator 6, to the shared argument expression list a.

At step S909, the combination feature generator 9 performs processing that connects the character string of any element in the wild card event slot history list w and the character string of any element in the shared argument expression list a with "&" on all of the pairs of elements, and obtains a dimension ID group c of the combination feature of the wild card history and the shared argument.

At step S910, the combination feature generator 9 returns, as a return value, each element of the dimension ID group c of the combination feature of the wild card history and the shared argument by adding ":1" to the last of the element.

As described above with reference to the specific examples, the data processing device 200 according to the second embodiment performs adjustment that applies an appropriate restriction to the event slot sequence when the restriction by the shared argument history feature used in the case example data in the first embodiment is too loose, thereby making it possible to construct the script model with high accuracy.

Figure 21:
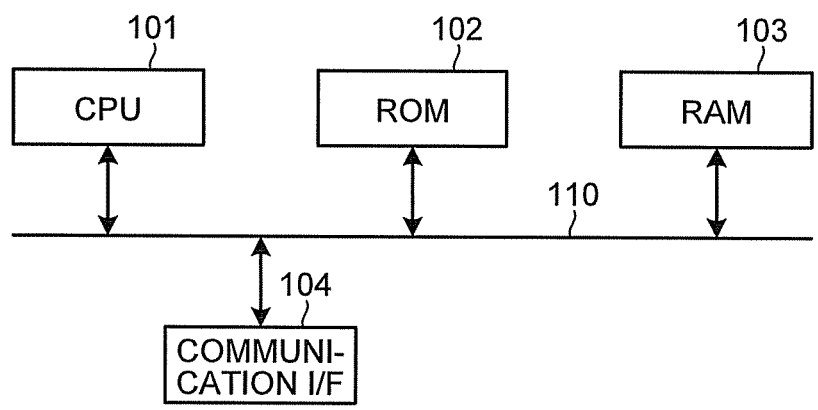
FIG. 21 is a schematic diagram explaining a hardware structure of the data processing device.

The data processing device 100 according to the first embodiment and the data processing device 200 according to the second embodiment can be achieved by executing a certain program in the data processing devices 100 and 200, for example. In such a case, the data processing device 100 (200) is achieved by a hardware structure using a typical computer as illustrated in FIG. 21, for example. The hardware structure illustrated in FIG. 21 includes a controller such as a central processing unit (CPU) 101, storages such as a read only memory (ROM) 102 and a random access memory (RAM) 103, a communication interface (I/F) 104 that performs communication by being connected to a network, and a bus 110 that connects the respective units.

The program executed by the data processing device 100 (200) is recorded and provided in a computer-readable storage medium such as a compact disc read only memory (CD-ROM), a flexible disk (FD), a compact disc recordable (CD-R), and a digital versatile disc (DVD), as an installable or executable file.

The program executed by the data processing device 100 (200) may be stored in a computer connected to a network such as the Internet and provided by being downloaded via the network. The program executed by the data processing device 100 (200) may be provided or distributed via a network such as the Internet.

The program executed by the data processing device 100 (200) may be embedded and provided in the ROM 102, for example.

The program executed by the data processing device 100 (200) has a module structure including the respective processing units (the text analyzer 1, the event slot sequence extractor 2, the case example generator 3 (3'), the event slot history feature generator 4, the shared argument history feature generator 5 (the combination feature generator 9), the shared argument expression generator 6, the following event slot estimation trainer 7, and the following event slot estimation predictor 8) of the data processing device 100 (200). In actual hardware, the CPU 101 (processor) reads the program from the recording medium and executes the program. Once the program is executed, the respective processing units are loaded into a main storage, resulting in the respective control units being formed in the main storage. Part of or the whole of the respective control units of the data processing device 100 (200) can be achieved using dedicated hardware such as an application specific integrated circuit (ASIC) and a field-programmable gate array (FPGA).

The data processing device 100 (200) performs both of the training processing that constructs the following event slot estimation model D10 (script model) and the prediction processing that estimates the following event slot of the analysis target document D5 using the following event slot estimation model D10 constructed by the training processing. The data processing device 100 (200) may perform only the prediction processing. In this case, the training processing is preliminarily performed using an external device, for example, to construct the following event slot estimation model D10. The data processing device 100 (200), then, receives the following event slot estimation model D10 from the external device and the analysis target document D5 to perform the prediction processing.

The data processing device 100 (200) performs the prediction processing that estimates the following event slot of the analysis target document D5 using the following event slot estimation model D10 constructed by the training processing. The data processing device 100 (200) may execute other various applications using the following event slot estimation model D10 (script model) constructed by the training processing. For example, when an application for anaphora resolution is executed, the anaphora resolution can be performed by producing the case example data for the anaphora resolution using the following event slot estimation model D10 (script model) constructed by the training processing, and performing the machine learning using the case example data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing device comprising:
processing circuitry configured to function as:
an extractor configured to extract, from a document having been subjected to predicate argument structure analysis and anaphora resolution, an element sequence in which a plurality of elements are arranged in order of appearances of predicates in the document, each of the elements being a combination of a predicate having a shared argument and case type information indicating a type of a case of the shared argument, together with the shared argument;
a case example generator configured to produce case example data for training expressed by a feature vector for each attention element, the attention element being one of the elements included in the extracted element sequence, the feature vector including one or more feature values about a sub-sequence having the attention element as a last element of the sub-sequence in the extracted element sequence and one or more feature values about a sequence of the shared argument corresponding to the sub-sequence; and
a model constructor configured to train a script model using the produced case example data and employing a discriminative model training technique; and
a text analyzer configured to (1) analyze a target document, (2) predict unknown elements in the target document using the trained script model, and (3) output the prediction results of the unknown elements.

2. The data processing device according to claim 1, wherein the case example generator is configured to produce, for each attention element, the case example data for training expressed by the feature vector further including one or more feature values about a combination obtained by a logical product of the shared argument and the sub-sequence in which a part of the elements is replaced with a wild card.

3. The data processing device according to claim 1, wherein the one or more feature values about the sequence of the shared argument are one or more feature values that discriminate the shared argument using at least one of a surface or a normalized surface, information about a grammatical category, information about a semantic category, and information about a named entity type.

4. The data processing device according to claim 1, wherein the sub-sequence includes a unigram sequence having only the attention element as a single element.

5. The data processing device according to claim 1, wherein word sense identification information that identifies a word sense of the predicate is added to the predicate included in each of the elements.

6. A script model construction method that is implemented by a data processing device, the script model construction method comprising:
extracting, from a document having been subjected to predicate argument structure analysis and anaphora resolution, an element sequence in which a plurality of elements are arranged in order of appearances of predicates in the document, each of the elements being a combination of a predicate having a shared argument and case type information indicating a type of a case of the shared argument, together with the shared argument;
producing case example data for training expressed by a feature vector for each attention element, the attention element being one of the elements included in the extracted element sequence, the feature vector including one or more feature values about a sub-sequence having the attention element as a last element of the sub-sequence in the extracted element sequence and one or more feature values about a sequence of the shared argument corresponding to the sub-sequence;
training a script model using the produced case example data and employing a discriminative model training technique;
analyzing a target document;
predicting unknown elements in the target document using the trained script model; and
outputting the prediction results of the unknown elements.

* * * * *